United States Patent
Lee et al.

(10) Patent No.: US 10,418,860 B2
(45) Date of Patent: Sep. 17, 2019

(54) METHOD FOR GENERATING LOAD OF WIRELESS POWER RECEIVER IN WIRELESS CHARGING SYSTEM AND WIRELESS POWER RECEIVER

(71) Applicant: Samsung Electronics Co., Ltd., Gyeonggi-do (KR)

(72) Inventors: Kyung-Woo Lee, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 189 days.

(21) Appl. No.: 15/069,407

(22) Filed: Mar. 14, 2016

(65) Prior Publication Data
US 2016/0268815 A1   Sep. 15, 2016

(30) Foreign Application Priority Data
Mar. 13, 2015   (KR) ......................... 10-2015-0035282

(51) Int. Cl.
| | |
|---|---|
| *H02J 5/00* | (2016.01) |
| *H02J 50/40* | (2016.01) |
| *H02J 50/10* | (2016.01) |
| *H02J 7/02* | (2016.01) |
| *H02J 50/90* | (2016.01) |
| *H02J 50/80* | (2016.01) |

(52) U.S. Cl.
CPC .............. *H02J 50/40* (2016.02); *H02J 7/025* (2013.01); *H02J 50/10* (2016.02); *H02J 50/90* (2016.02); *H02J 50/80* (2016.02)

(58) Field of Classification Search
CPC ............. H02J 50/10; H02J 50/40; H02J 50/80
USPC ........................................................ 307/104
See application file for complete search history.

(56) References Cited

U.S. PATENT DOCUMENTS

| | | | |
|---|---|---|---|
| 2007/0228833 A1* | 10/2007 | Stevens ................... | H02J 5/005 307/45 |
| 2009/0284082 A1 | 11/2009 | Mohammadian | |
| 2010/0066349 A1 | 3/2010 | Lin et al. | |
| 2012/0133216 A1 | 5/2012 | Amma et al. | |
| 2012/0235509 A1* | 9/2012 | Ueno ...................... | H02J 5/005 307/104 |
| 2012/0299388 A1 | 11/2012 | Gong | |

(Continued)

FOREIGN PATENT DOCUMENTS

| | | |
|---|---|---|
| EP | 2 525 461 | 11/2012 |
| KR | 101390954 | 4/2014 |

OTHER PUBLICATIONS

International Search Report dated May 31, 2016 issued in counterpart application No. PCT/KR2016/002534, 8 pages.

(Continued)

*Primary Examiner* — Thienvu V Tran
*Assistant Examiner* — Brian K Baxter
(74) *Attorney, Agent, or Firm* — The Farrell Law Firm, P.C.

(57) ABSTRACT

A wireless power receiver (PRU) and a method for generating a load of the PRU for detecting the PRU in a wireless charging system are provided. The method includes receiving a wireless power signal from a wireless power transmitter (PTU), rectifying the received wireless power signal into a direct current (DC) signal, and generating a load for detecting the PRU by controlling a current flowing across a resistor connected in parallel with a load charged with power of the DC signal.

13 Claims, 16 Drawing Sheets

(56) References Cited

U.S. PATENT DOCUMENTS

| | | |
|---|---|---|
| 2013/0099586 A1 | 4/2013 | Kato |
| 2013/0134927 A1 | 5/2013 | Park et al. |
| 2014/0300314 A1* | 10/2014 | Nakano .................. H02J 7/025 320/108 |
| 2014/0361738 A1 | 12/2014 | Lee et al. |
| 2015/0022149 A1 | 1/2015 | Bae |
| 2015/0229135 A1* | 8/2015 | Porat ....................... H02J 7/025 307/104 |
| 2015/0244341 A1* | 8/2015 | Ritter ...................... H01F 38/14 307/104 |
| 2015/0349538 A1* | 12/2015 | Agostinelli ............. H02J 50/12 307/104 |
| 2016/0181858 A1* | 6/2016 | Satyamoorthy ...... H04B 5/0037 307/104 |
| 2016/0197486 A1* | 7/2016 | Von Novak, III ...... H02J 7/025 307/104 |
| 2016/0226296 A1* | 8/2016 | Bae .......................... H02J 5/00 |
| 2016/0226298 A1* | 8/2016 | Shimokawa ............ H02J 50/40 |

OTHER PUBLICATIONS

European Search Report dated Feb. 15, 2018 issued in counterpart application No. 16765226.2-1202, 8 pages.

* cited by examiner

METHOD FOR GENERATING LOAD OF WIRELESS POWER RECEIVER IN WIRELESS CHARGING SYSTEM AND WIRELESS POWER RECEIVER

PRIORITY

This application claims priority under 35 U.S.C. § 119(a) to Korean Patent Application Serial No. 10-2015-0035282, which was filed in the Korean Intellectual Property Office on Mar. 13, 2015, the entire disclosure of which is incorporated herein by reference.

BACKGROUND

1. Field of the Disclosure

The present disclosure relates generally to wireless charging, and more specifically, to a wireless power receiver and methods for generating a load of the wireless power receiver in a wireless charging system.

2. Description of the Related Art

A mobile terminal, such as a mobile phone or a personal digital assistant (PDA), is generally powered by a rechargeable battery. To recharge the battery, a separate charger is used. Typically, the charger and the battery have separate contacts for electrical connection therebetween.

However, these type of contacts, which normally project outward, may be easily contaminated by foreign bodies, which may inhibit the battery charging.

To address such issues, wireless or contactless recharging techniques have been developed.

Such wireless recharging technology adopts wireless power transmission/reception. For example, wireless recharging allows a mobile phone to be automatically recharged when placed on a recharging pad.

By eliminating the use of a physical connector and/or cable, wireless recharging provides a number of advantages including enhanced waterproofing and portability.

Various examples of wireless charging include using electromagnetic induction, resonance, and radio frequency (RF)/microwave radiation.

Currently, inductive charging is fairly common, but by its nature, has limited applications.

Inductive charging (or magnetic induction) transfers electric power between a primary coil and a second coil. Movement of a magnet near a coil induces an electric current that creates a magnetic field on a side of a sender, and a variation in the magnetic field enables an electric current to be induced on a side of a receiver. Such inductive power transfer presents high energy transfer efficiency.

Resonant charging transfers electricity within a range of a few meters between a charger and a target. Basically, resonated electromagnetic waves carry electrical energy instead of sound. Resonated electric energy directly transfers only when there is an object having the resonant frequency, and an unused portion is absorbed back into the electromagnetic fields, rather than spread in the air. This is beneficial as it does influence ambient machines or human bodies, unlike other electromagnetic waves.

Wireless charging using microwave radiation is capable of long-distance transfer of power and is expected to gain more popularity in the future.

In order for a wireless power transmitter (or a power transmission unit (PTU)) to detect the placement of a wireless power receiver (or a power receive unit (PRU)), the PTU senses a variation in impedance.

When sensing the placement by the PTU, too small a threshold for an impedance variation may result in faulty detection, and too large threshold may lead to detection failure for small objects.

Further, if an impedance difference between the PTU without the PRU placed thereon and the PTU with the PRU place thereon is not substantial, the PTU may not correctly sense a variation in the load. That is, the impedance difference created when the PRU is placed on the PTU should be large enough for the PTU to detect the load variation.

Further, conventional detection methods have difficulty in detection because when the PRU is placed on the PTU, the resistance may vary but the variation in power due to the load variation may be too small to detect. Further, there may be spots on the PTU where the reactance does not change.

For example, when a load variation is caused at an alternating current (AC) terminal of the PRU, because different impedance variations are measured depending on combinations of the PTU and the PRU, if more load-pull power is consumed in the amplification unit of the PTU, the PTU may be subject to negative influences such as overcurrent or overvoltage.

Another conventional method in which a load variation occurs at a direct current (DC) terminal varies only resistance. Thus, if the value is not large, the PTU has difficulty in load detection, and if the value is too large, more standby power consumption may occur because more power should be transferred to a long beacon of the PTU.

SUMMARY

Accordingly, an aspect of the present disclosure is to provide a PRU and a load generation method of the PRU, wherein a load is effectively detected by a PTU by adding a dummy load to the PRU when the PTU detects a load due to an impedance variation.

Another aspect of the present disclosure is to provide a PRU and a load generation method of the PRU, which generate a load meeting a preset condition by converting a signal received from the PRU into a DC signal and applying a constant voltage of signal to a dummy load by a linear regulator.

Another aspect of the present disclosure is to provide a PRU and a load generation method of the PRU, which generate a load meeting a preset condition by converting a signal received from the PRU into a DC signal and controlling a current flowing across a dummy load by pulse width modulation (PWM) switching.

In accordance with an aspect of the present disclosure, a method is provided for generating a load of a PRU for detecting the PRU in a wireless charging system. The method includes receiving a wireless power signal from a PTU; rectifying the received wireless power signal into a DC signal; and generating a load for detecting the PRU by controlling a current flowing across a resistor connected in parallel with a load charged with power of the DC signal.

In accordance with another aspect of the present disclosure, a PRU is provided that generates a load in a wireless charging system. The PRU includes a power receiver configured to receive a wireless power signal from a PTU; a rectifier configured to rectify the wireless power signal received from the power receiver into a DC signal; a resistor connected in parallel with a load charged with power of the DC signal; and a controller configured to control a current flowing across the resistor.

In accordance with another aspect of the present disclosure, a method is provided for generating a load of a PRU for detecting the PRU in a wireless charging system. The method includes receiving, via a resonator, a wireless power signal from a PTU; rectifying, by a rectifier, the received wireless power signal into a DC signal; and generating loads for detecting the PRU by controlling current flowing across dummy loads connected in parallel between the resonator and the rectifier.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, various embodiments of the present disclosure are described in detail with reference to the accompanying drawings. It should be noted that the same element names and numerals may be refer to the same or similar elements throughout the specification. Further, detailed descriptions of known functions or configurations are omitted to avoid obscuring the present disclosure in unnecessary detail.

Figure 1:
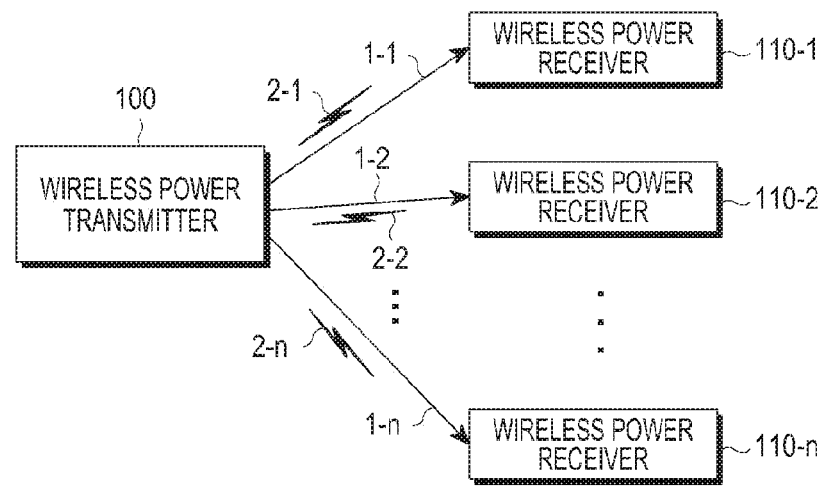
FIG. 1 illustrates an overall operation of a wireless charging system.

FIG. 1 illustrates an overall operation of a wireless charging system.

Referring to FIG. 1, the wireless charging system includes a PTU 100 and PRUs 110-1, 110-2, and 110-n.

The PTU 100 may wirelessly send power 1-1, 1-2, and 1-n to the PRUs 110-1, 110-2, and 110-n, respectively, when authenticated by a predetermined authentication process.

The PTU 100 may form electrical connections with the PRUs 110-1, 110-2, and 110-n. For example, the PTU 100 may transmit electromagnetic waves of wireless power to the PRUs 110-1, 110-2, and 110-n.

The PTU 100 may perform bi-lateral communication with the PRUs 110-1, 110-2, and 110-n. For example, the PTU 100 and the PRUs 110-1, 110-2, and 110-n may process or communicate packets 2-1, 2-2, and 2-n including predetermined frames. Each of the PRUs 110-1, 110-2, and 110-n may be implemented as a mobile communication terminal, a personal digital assistant (PDA), a portable media player (PMP), or a smartphone.

The PTU 100 may wirelessly provide power to a plurality of PRUs 110-1, 110-2, and 110-n. For example, the PTU 100 may transmit power to the plurality of PRUs 110-1, 110-2, and 110-n through resonance. When the PTU 100 uses resonance, the distance between the PTU 100 and the plurality of PRUs 110-1, 110-2, and 110-n is preferably not more than 30 m. When the PTU 100 uses electromagnetic induction, the distance between the PTU 100 and the plurality of PRUs 110-1, 110-2, and 110-n is preferably not more than 10 cm.

The PRUs 110-1, 110-2, and 110-n may receive the wireless power from the PTU 100 to charge their respective batteries. The PRUs 110-1, 110-2, and 110-n may transmit, to the PTU 100, a signal for requesting the PTU 100 to transmit wireless power, information for receiving wireless power, state information of the PRUs, and/or control information of the PTU 100.

The PRUs 110-1, 110-2, and 110-n may transmit, to the PTU 100, messages that indicate the respective states of the PRUs 110-1, 110-2, and 110-n.

The PTU 100 may include a display that displays respective states of the PRUs 110-1, 110-2, and 110-n, based on the messages received from the PRUs 110-1, 110-2, and 110-n. Further, the PTU 100 may also display an estimated remaining time until each of the PRUs 110-1, 110-2, and 110-n is completely charged.

The PTU 100 may transmit a control signal to disable the wireless charging function to each of the PRUs 110-1, 110-2, and 110-n. When receiving the control signal to disable the wireless charging function from the PTU 100, the PRUs 110-1, 110-2, and 110-n may disable the wireless charging functions.

Figure 2:
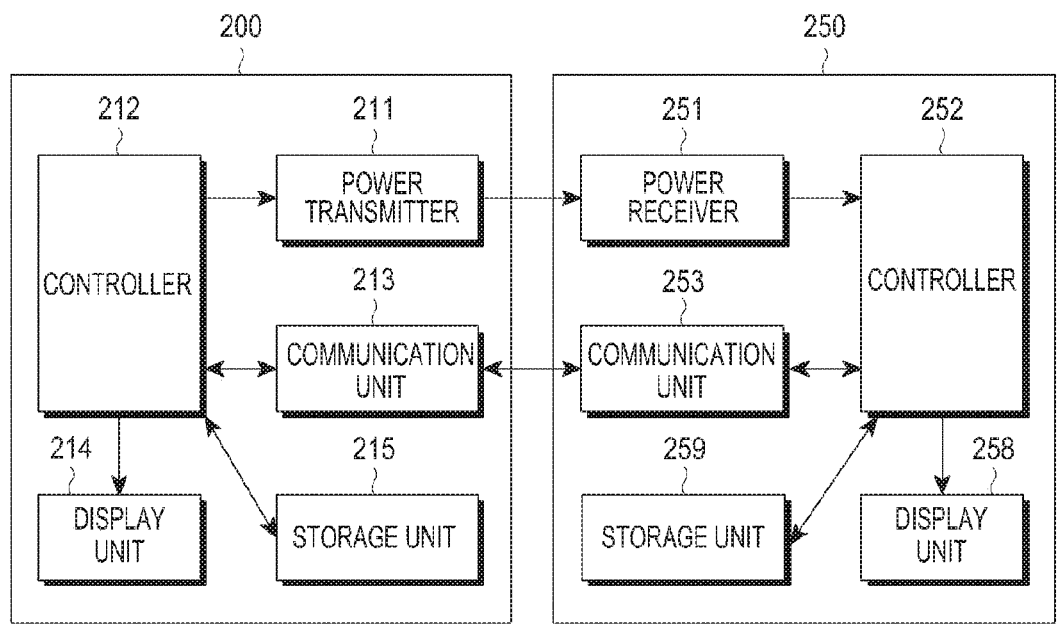
FIG. 2 illustrates a PTU and a PRU according to an embodiment of the present disclosure.

FIG. 2 illustrates a PTU and a PRU according to an embodiment of the present disclosure.

Referring to FIG. 2, the PTU 200 includes a power transmitter 211, a controller 212, a communication unit 213, a display unit 214, and a storage unit 215.

The power transmitter 211 may provide power required by the PTU 200 and may wirelessly provide wireless power to the PRU 250. The power transmitter 211 may supply power in the form of an AC waveform or may convert a DC waveform into an AC waveform using an inverter, and supply the AC waveform power. The power transmitter 211 may be implemented in the form of an embedded battery or in the form of a power receiving interface, such that it receives power from the outside and supplies the power to other components. It will be appreciated by one of ordinary skill in the art that the power transmitter 211 is not particularly limited as long as it may provide an AC waveform of power.

The controller 212 may control the overall operation of the PTU 200, e.g., using an algorithm, program, or application read out from the storage unit 215. For example, the controller 212 may be implemented as a central processing unit (CPU), a microprocessor, or a mini-computer.

The communication unit 213 may communicate with the PRU 250 via a predetermined scheme. The communication unit 213 may receive power information from the PRU 250. For example, the power information may include at least one of capability, remaining battery, recharge count, usage, battery capability, and battery ratio of the PRU 250.

Further, the communication unit 213 may transmit a charging function control signal to control the charging function of the PRU 250. The charging function control signal may enable or disable the charging function by controlling the power receiver 251 the PRU 250. For example, the power information may include insertion of a wired charging terminal, switch from an SA mode to a non-stand alone (NSA) mode, or an erroneous condition release.

Further, the charging function control signal may include information related to a power adjustment or power control command to respond to an erroneous circumstance.

The communication unit 213 may receive signals from other PTUs, as well as from the PRU 250.

The controller 212 may display, on the display unit 214, the state of the PRU 250, based on a message received from the PRU 250 through the communication unit 213. Further, the controller 212 may display, on the display unit 214, a remaining time until the PRU 250 to be fully charged.

The PRU 250 includes a power receiver 251, a controller 252, a communication unit 253, a display unit 258, and a storage unit 259.

The power receiver 251 may wirelessly receive power transmitted from the PTU 200. The power receiver 251 may receive the power in an AC waveform.

The controller 252 may control the overall operation of the PRU 250, e.g., using an algorithm, program, or application read out from the storage unit 259. For example, the controller 252 may be implemented as a CPU, a microprocessor, or a mini-computer.

The communication unit 253 may communicate with the PTU 200 via a predetermined scheme. The communication unit 253 may transmit power information to the PTU 200. For example, the power information may include at least one of capability, remaining battery, recharge count, usage, battery capability, and battery ratio of the PRU 250.

Further, the communication unit 253 may transmit a charging function control signal to control the charging function of the PRU 250. The charging function control signal may be a control signal that enables or disables the charging function by controlling the power receiver 251 the PRU 250. For example, the power information may include a wired charging terminal, switch from an SA mode to an NSA mode, or erroneous condition release.

Further, the charging function control signal may include information related to a power adjustment or power control command to respond to an erroneous circumstance. The controller 252 may perform control to display the state of the PRU 250 on the display unit 258. Further, the controller 252 may display, on the display unit 258, a remaining time until the PRU 250 to be fully charged.

Figure 3:
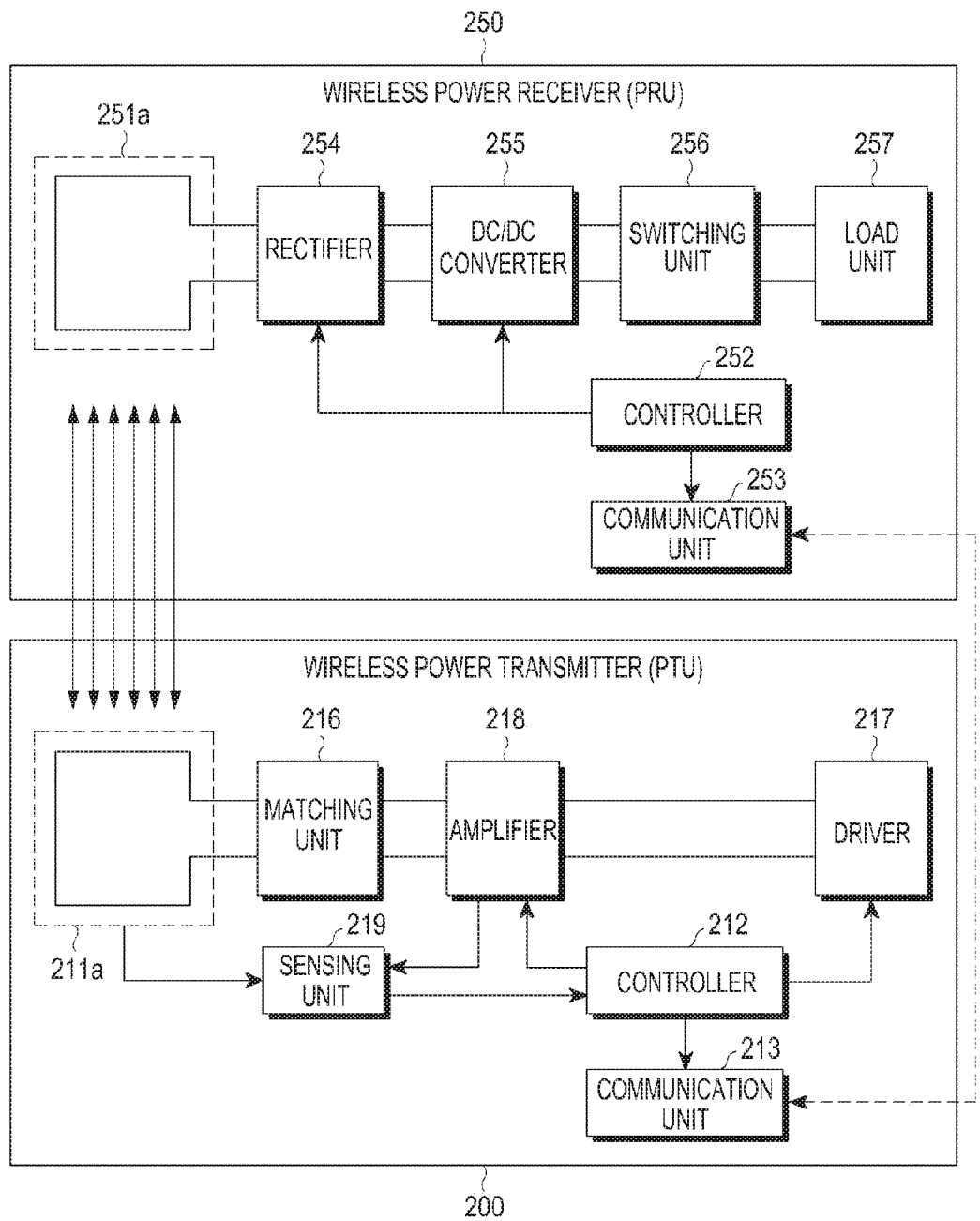
FIG. 3 illustrates a PTU and a PRU according to an embodiment of the present disclosure.

FIG. 3 illustrates a PTU and a PRU according to an embodiment of the present disclosure.

Referring to FIG. 3, the PTU 200 includes a transmit (Tx) resonator 211a, a controller 212 (e.g., a micro control unit (MCU)), a communication unit 213 (e.g., an out-of-band signaling unit), a matching unit (or a matching circuit) 216, a driver (or a power supply) 217, an amplifier (e.g., a power amp.) 218, and a sensing unit 219.

The PRU 250 includes a receive (Rx) resonator 251a, a controller 252, a communication unit 253, a rectifier 254, a DC/DC converter 255, a switching unit (e.g., a switch) 256, and a load unit (e.g., a client device load) 257.

The driver 217 may output DC power with a preset voltage. The voltage value of DC power output from the driver 217 may be controlled by the controller 212.

The DC current output from the driver 217 may be output to the amplifier 218. The amplifier 218 may amplify a DC current with a preset gain. Further, the DC power may be converted into AC power based on a signal input from the controller 212. Accordingly, the amplifier 218 may output AC power.

The matching unit 216 may perform impedance matching. For example, the impedance viewed from the matching unit 216 may be adjusted to perform control so that the output power shows a higher efficiency or higher output. The sensing unit 219 may sense a load variation by the PRU 250 through the Tx resonator 211a or the amplifier 218. A result of the sensing by the sensing unit 219 may be provided to the controller 212.

The matching portion 216 may adjust the impedance under the control of the controller 212. The matching unit 216 may include at least one of a coil and a capacitor. The controller 212 may control the connection with at least one of the coil and the capacitor and may accordingly perform impedance matching.

The Tx resonator 211a may transmit input AC power to the Rx resonator 251a. The Tx resonator 211a and the Rx resonator 251a may be implemented as resonant circuits having the same resonant frequency. For example, the resonant frequency may be determined as 6.78 MHz.

The communication unit 213 may perform communication with the communication unit 253 of the PRU 250, e.g., bilateral communication (Wi-Fi, ZigBee, or BT/BLE) at 2.4 GHz.

The Rx resonator 251a may receive power for charging.

The rectifier 254 may rectify the wireless power received by the Rx resonator 251a into a DC form and, for example, may be implemented as bridged diodes.

The DC/DC converter 255 may convert the rectified power with a preset gain. For example, the DC/DC converter 255 may convert the rectified power so that the voltage at the output end is 5V. A minimum value and a maximum value of the voltage applicable to the front end of the DC/DC converter 255 may be previously set.

The switching unit 256 may connect the DC/DC converter 255 with the load unit 257. The switching unit 256 may maintain an on/off status under the control of the controller 252. The switching unit 256 may be omitted. The load unit 257 may store the converted power input from the DC/DC converter 255 when the switching unit 256 is in an on status.

Figure 4:
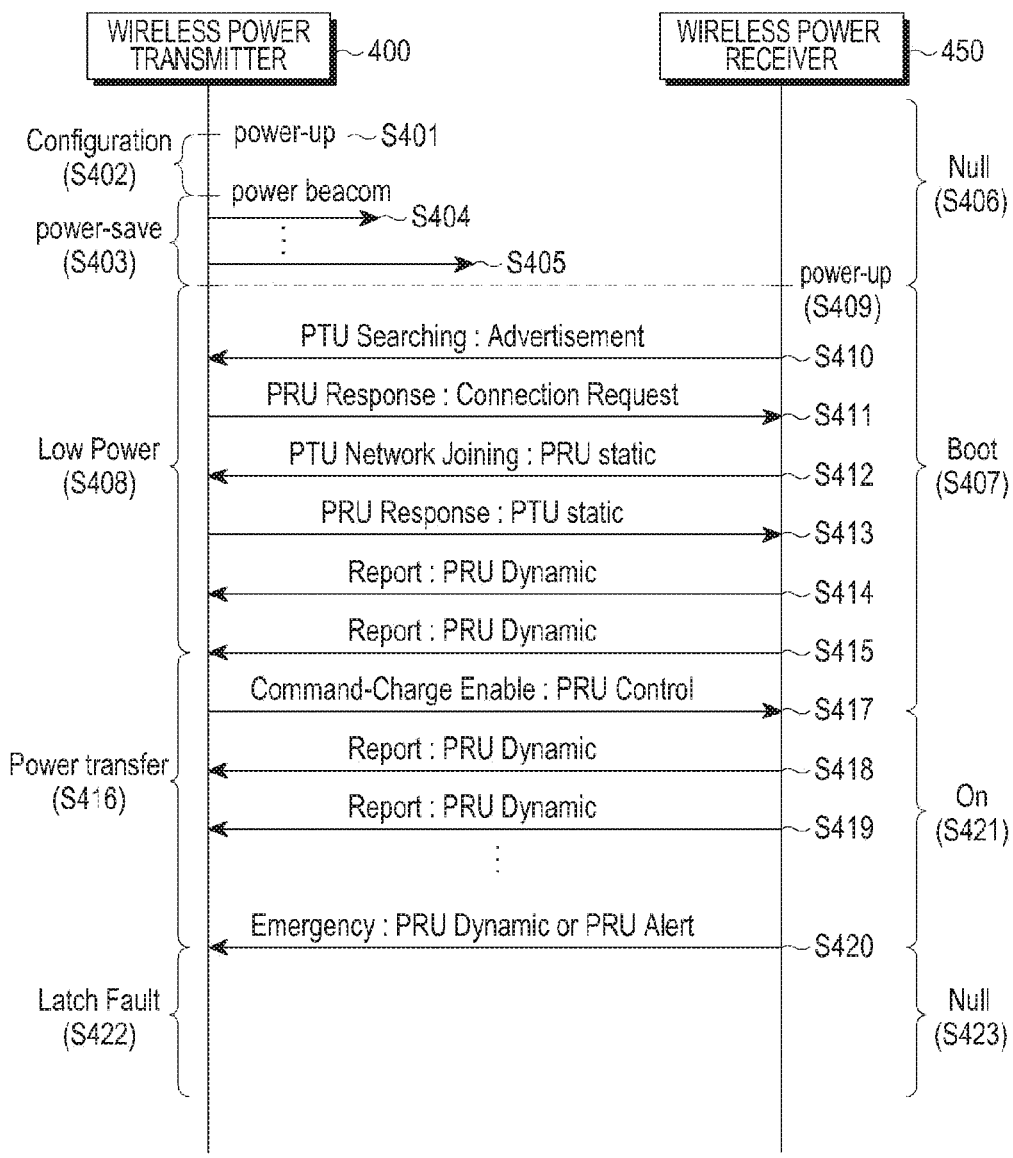
FIG. 4 is a signal flow diagram illustrating an operation of a PTU and a PRU according to an embodiment of the present disclosure.

FIG. 4 is a signal flow diagram illustrating an operation of a PTU and a PRU according to an embodiment of the present disclosure.

Referring to FIG. 4, the PTU 400 powers up in step S401, and configures an environment in step S402.

In step S403, the PTU 400 enters into a power save mode. In the power save mode, the PTU 400 periodically broadcasts different power beacons for detection, which will be described below in greater detail with reference to FIG. 6. For example, in FIG. 4, the PTU 400 broadcasts power beacons 404 and 405 for detection (e.g., a short beacon or a long beacon), and the respective power values of the power beacons 404 and 405 for detection may be different from each other.

All or some of the power beacons 404 and 405 for detection may have an amount of power at which the communication unit of the PRU 450 may be driven. For example, the PRU 450 may drive the communication unit using the power beacons 404 and 405 for detection in order to communicate with the PTU 400. This state may be referred to as a null state S406.

The PTU 400 detects a load variation that occurs as the PRU 450 is placed in a charging area of the PTU 400.

In step S408, the PTU 400 may enter into a low power mode, which will be described below in greater detail with reference to FIG. 6.

In step S409, the PRU 450 drives (e.g., powers-up) the communication unit therein based on the power received from the PTU 400.

In step S410, the PRU 450 transmits a PTU searching signal to the PTU 400. For example, the PTU searching signal may be a BLE-based advertisement (AD) signal.

The PRU 450 may periodically transmit PTU searching signals and perform such transmission until the PRU 450 receives a response signal from the PTU 400 or a predetermined time arrives.

Upon receiving the PTU searching signal from the PRU 450, the PTU 400 transmits a response signal, i.e., a PRU response, in step S411. The PRU response may form a connection between the PTU 400 and the PRU 450.

In step S412, the PRU 450 transmits a PRU static signal. The PRU static signal may indicate the state of the PRU 450 and request to enlist in a wireless power network that is controlled by the PTU 400.

In step S413, the PRU 400 may transmits a PRU static signal. The PTU static signal may indicate the capability of the PTU 400.

When the PTU 400 and the PRU 450 communicate the PRU static signal and the PTU static signal, the PRU 450 periodically transmits PRU dynamic signals in steps S414 and S415. The PRU dynamic signal may include at least one piece of parameter information measured by the PRU 450. For example, the PRU dynamic signal may include information regarding a voltage at a rear end of the rectifier of the PRU 450. In step S407, the PRU 450 is in a boot state.

The PTU 400 enters into a power transfer (or power transmit) mode in step S416, and the PTU 400 may transmit a PRU control signal, a command signal, to enable the PRU 450 to perform charging in step S417. In the power transmit mode, the PTU 400 may transmit charging power.

The PRU control signal transmitted from the PTU 400 may include information for enabling/disabling the charging of the PRU 450 and permission information. The PRU control signal may be transmitted whenever the charging state varies. The PRU control signal may be transmitted, e.g., every 250 ms, or when there is a parameter variation. The PRU control signal may be configured to be transmitted within a predetermined threshold time, e.g., 1 second, even when the parameter is not varied.

The PRU 400 may vary the configuration according to the PRU control signal and transmits a PRU dynamic (PRU dynamic) signal to report the state of the PRU 450 in steps S418 and S419. The PRU dynamic signal may include at least one of voltage information, current information, PRU state information, and temperature information. In step S421, the state of the PRU 450 may be referred to as an On state.

The PRU dynamic signal may have a data structure as shown in Table 1 below.

TABLE 1

| Field | Octets | Description | Use | Units |
|---|---|---|---|---|
| Optional fields | 1 | Defines which optional fields are populated | Mandatory | |
| $V_{RECT}$ | 2 | Voltage at diode output | Mandatory | mV |
| $I_{RECT}$ | 2 | Current at diode output | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Deg. C. from −40 C. |
| $V_{RECT\_MIN\_DYN}$ | 2 | $V_{RECT\_LOW\_LIMIT}$(dynamic value) | Optional | mV |
| $V_{RECT\_SET\_DYN}$ | 2 | Desired $V_{RECT}$(dynamic value) | Optional | mV |
| $V_{RECT\_HIGH\_DYN}$ | 2 | $V_{RECT\_HIGH\_LIMIT}$(dynamic value) | Optional | mV |
| PRU alert | 1 | Warnings | Mandatory | Bit field |
| RFU | 3 | Undefined | | |

As shown in Table 1, the PRU dynamic signal may include different fields including selective field information, information on a voltage at a rear end of the rectifier of the PRU, information on a current at the rear end of the rectifier of the PRU, information on a voltage at a rear end of the DC/DC converter of the PRU, information on a current at the rear end of the DC/DC converter of the PRU, temperature information, information on a minimum voltage value ($V_{RECT\_MIN\_DYN}$) at the rear end of the rectifier of the PRU, information on an optimal voltage value ($V_{RECT\_SET\_DYN}$) at the rear end of the rectifier of the PRU, information on a maximum voltage value ($V_{RECT\_HIGH\_DYN}$) at the rear end of the rectifier of the PRU, and alert information (PRU alert). For example, the PRU dynamic signal may include at least one of the above-described fields.

For example, at least one voltage configuration value determined according to the charging state (e.g., the information on the minimum voltage value ($V_{RECT\_MIN\_DYN}$) at the rear end of the rectifier of the PRU, the information on the optimal voltage value ($V_{RECT\_SET\_DYN}$) at the rear end of the rectifier of the PRU, or the information on the maximum voltage value ($V_{RECT\_HIGH\_DYN}$) at the rear end of the rectifier of the PRU) may be included in a corresponding field in the PRU dynamic signal and transmitted. As such, upon receiving the PRU dynamic signal, the PTU may adjust a wireless charging voltage to be transmitted to each PRU by referring to the voltage configuration value included in the PRU dynamic signal.

Among others, the alert information (PRU alert) may be formed in a data structure as shown in Table 2 below.

TABLE 2

| 7 | 6 | 5 | 4 | 3 | 2 | 1 | 0 |
|---|---|---|---|---|---|---|---|
| Overvoltage | Overcurrent | Overtemp | Charge complete | TA detect | Transition | restart request | RFU |

As shown in Table 2, the alert information (PRU alert) may include a bit for a restart request, a bit for transition, and a bit for detecting insertion of a wired charging adapter (or a travel adapter (TA) detect). The TA detect denotes a bit indicating that the PRU is connected to a terminal for wired charging in the PTU providing wireless charging. The bit for transition denotes a bit informing the PTU that the PRU is reset before a communication integrated circuit (IC) of the PRU switches from an SA mode to an NSA mode. The restart request is a bit by which the PTU informs the PRU that charging is ready to resume when a normal state turns back from the overcurrent or over temperature state, where the PTU reduces transmit power to disconnect charging.

Further, the alert information (PRU alert) may also be formed in a data structure as shown in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

As shown in Table 3, the alert information (PRU alert) may include over voltage, over current, over temperature, PRU (PRU) self protection, charge complete, wired charge detect, and mode transition. When the over voltage field is set to 1, this may indicate that the voltage Vrect in the PRU exceeds an over voltage threshold. Further, the over current and over temperature may be set in the same manner as is for the over voltage. Further, the PRU self protection (PRU self protection) indicates that the PRU itself reduces the power to the load to protect itself, and in such case, the PTU need not change the charging state.

According to an embodiment of the present disclosure, the bit for mode transition may be set as a value for reporting a period during which a mode transition procedure proceeds to the PTU. The bit indicating the mode transition period may be represented as shown in Table 4 below.

TABLE 4

| Value(Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

As shown in Table 4, "00" indicates that there is no mode transition, "01" indicates that a time required to complete mode transition is up to 2 seconds, "10" indicates that a time required to complete mode transition is up to 3 seconds, and "11" indicates that a time required to complete mode transition is up to 6 seconds.

For example, when 3 seconds or less are required to complete mode transition, the mode transition bit may be set to "10". Prior to such mode transition procedure, the PRU may vary the input impedance configuration to fit a 1.1 W power draw so that no impedance variation occurs during the mode transition procedure. Accordingly, the PTU may adjust the power (ITX_COIL) for the PRU fitting such configuration, and accordingly, may maintain the power (ITX_COIL) for the PRU during the mode transition period.

Accordingly, when a mode transition period is set by the mode transition bit, the PTU may maintain the power (ITX_COIL) for the PTU for the mode transition time, e.g., 3 seconds. That is, the connection may be maintained even when no response is received from the PRU. However, after the mode transition time elapses, the PRU may be considered as a foreign object, and the power transmission may be terminated.

The PRU 450 may sense occurrence of an error.

In step S420, the PRU 450 transmits a warning signal to the PTU 400. The warning signal may be transmitted as a PRU dynamic signal or an alert signal. For example, the PRU 450 may reflect the error situation to the PRU alert field in Table 1 and transmit to the PTU 400. Alternatively, the PRU 450 may transmit a standalone warning signal indicating the error situation to the PTU 400.

In step S422, the PTU 400, upon receipt of the warning signal, may enter into a latch failure (or latch fault) mode.

In step S423, the PRU 450 may enter into a null state.

Figure 5:
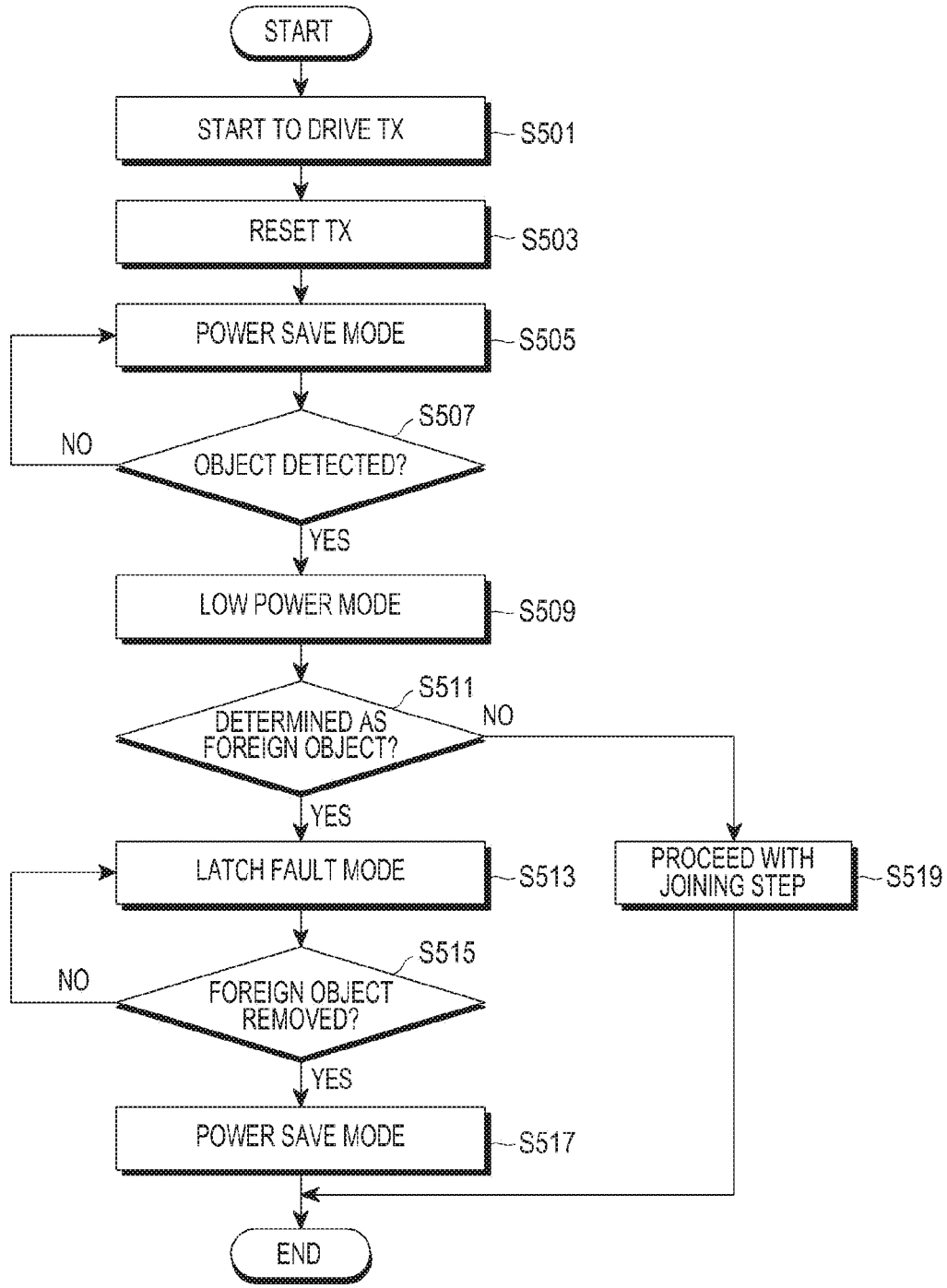
FIG. 5 is a flowchart illustrating an operation of a PTU and a PRU according to an embodiment of the present disclosure.

FIG. 5 is a flowchart illustrating an operation of a PTU and a PRU according to an embodiment of the present disclosure. FIG. 6 is a graph illustrating power broadcast from a PTU on a time axis according to the operation illustrated in FIG. 5.

Referring to FIG. 5, the PTU initiates driving in step S501.

In step S503, the PTU resets an initial configuration.

In step S505, the PTU enters into a power save mode, i.e., a period during which the PTU broadcasts different types of power with different amounts of power to the PRU. For example, during the power save mode, the PTU may broadcast second detection powers 601 and 602 and third detection powers 611, 612, 613, 614, and 615, as illustrated in FIG. 6, to the power transmitter.

Figure 6:
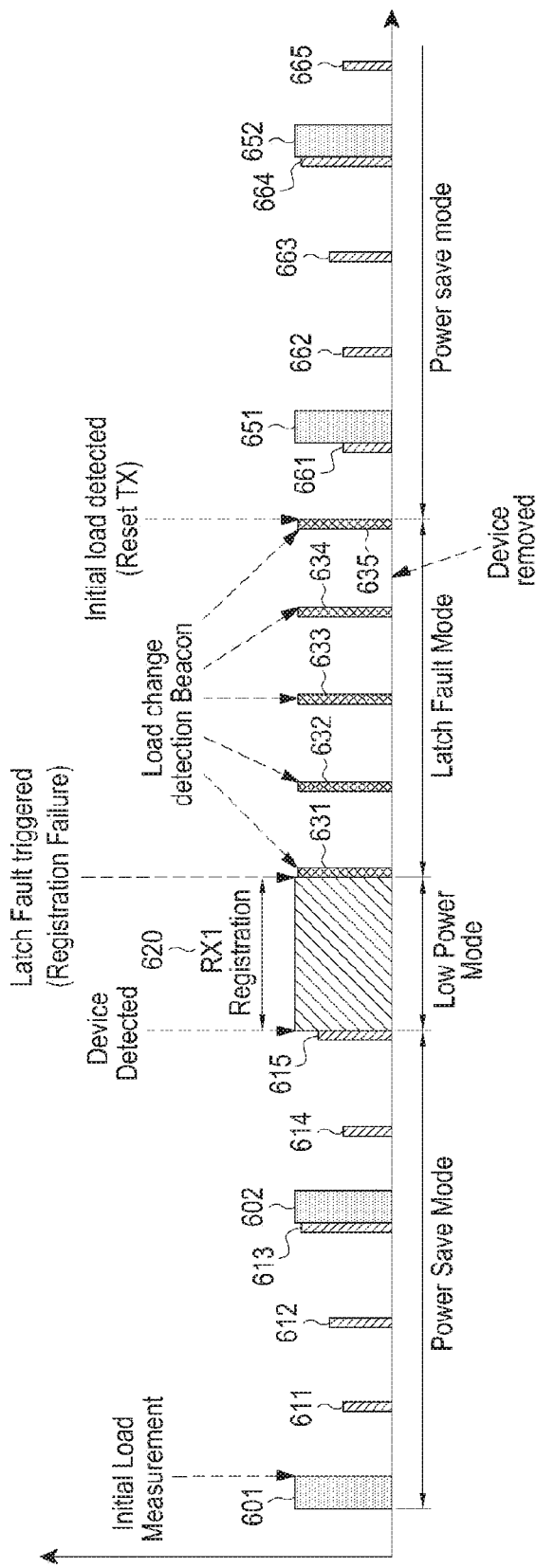
FIG. 6 is a graph illustrating power broadcast from a PTU on a time axis according to the operation illustrated in FIG. 5.

Referring to FIG. 6, the PTU may periodically broadcast the second detection powers 601 and 602 at a second period. The PTU may periodically broadcast the third detection powers 611, 612, 613, 614, and 615 at a third period. Although the power values of the third detection power 611, 612, 613, 614, and 615 are illustrated as differing from each other, they may also be the same.

The PTU, after outputting the third detection power 611, may output the third detection power 612 having the same amount of power. When the PTU outputs the same amount of third detection power, the third detection power may be an amount of power at which a smallest PRU, e.g., a category-1 PRU, may be detected.

Alternatively, the PTU, after outputting the third detection power 611, may output the third detection power 612 having a different amount of power. When the PTU outputs different amounts of third detection power, the amounts of the third detection power may be amounts of power at which category-1 to category-5 PRUs, respectively, may be detected. For example, the third detection power 611 may have an amount of power at which a category-5 PRU may be detected, the third detection power 612 may have an amount of power at which a category-3 PRU may be detected, and the third detection power 613 may have an amount of power at which a category-1 PRU may be detected.

The second detection powers 601 and 602 may drive the PRU. Specifically, the second detection powers 601 and 602 may be an amount of power by which a controller and/or a communication unit of the PRU may be driven.

The PRU may apply the second detection powers 601 and 602 and the third detection powers 611, 612, 613, 614, and 615 to the power receiver at a second period and third period, respectively.

When the PRU is placed on (or within a charging area of) the PTU, the impedance viewed from a point of the PTU may vary. The PTU may detect an impedance variation while the second detection powers 601 and 602 and the third detection powers 611, 612, 613, 614, and 615 are broadcast. For example, the PTU may detect an impedance variation while broadcasting the third detection power 615.

Referring again to FIG. 5, the PTU determines whether an object is detected in step S507. When no object is detected in step S507, the PTU maintains the power save mode in which different powers are periodically broadcast in step S505.

However, when the impedance varies and an object is detected in step S507, the PTU enters into the low power mode in step S509. In the low power mode, the PTU broadcasts driving power having an amount of power at which the controller and communication unit of the PRU may be driven.

For example, referring again to FIG. 6, the PTU may broadcast driving power 620 to the PRU. The PRU may receive the driving power 620 to drive the controller and/or communication unit therein. The PRU may communicate with the PTU based on the driving power 620 by a predetermined scheme. For example, the PRU may communicate data for authentication and may join the wireless power network controlled by the PTU based on the same. However, when the object placed on (or within a charging area of) the PTU is not the PRU, but is a foreign object, data communication cannot be performed.

Referring again to FIG. 5, the PTU determines whether the detected object is a foreign object in step S511. For example, the PTU, upon failing to receive a response from the object within a predetermined time, may determine that the object is a foreign object.

When the detected object is determined to be a foreign object in step S511, the PTU enters into a latch fault mode in step S513.

However, when the detected object is determined not to be a foreign object in step S511, the PTU performs a joining operation in step S519.

For example, referring again to FIG. 6, the PTU may periodically broadcast the first powers 631 to 634 at a first period. The PTU may detect an impedance variation while broadcasting the first power.

Referring again to FIG. 5, when the foreign object is removed in step S515, the PTU may detect an impedance variation, and determine that the foreign object has been removed.

When the foreign object is not removed in step S515, the PTU cannot detect an impedance variation, and determines that the foreign object is not removed.

When the PTU determines that the foreign object is not removed in step S515, the PTU maintains the latch fault mode in step S513. When the foreign object is not removed, the PTU may also output at least one of a light radiation and an alert sound to inform a user that the PTU is currently in an erroneous state. Accordingly, the PTU may include an output unit to output at least one of a light radiation and an alert sound.

When the PTU determines that the foreign object is removed in step S515, the PTU reenters into the power save mode in step S517.

For example, referring again to FIG. 6, the PTU may broadcast the second powers 651 and 652 and the third powers 651 to 665.

As described above, the PTU may enter into the latch fault mode when a foreign object is detected. Further, the PTU may determine whether the foreign object is removed based on an impedance variation by the power applied in the latch fault mode. That is, a condition for entry into the latch fault mode in FIGS. 5 and 6 may be a foreign object being placed.

Alternatively, the PTU may use other conditions for entry into the latch fault mode. For example, the PTU enter into the latch fault mode upon detecting a cross-connection with the PRU.

Accordingly, the PTU, when cross-connected, returns to the initial state, and the PRU should be removed.

The PTU may set a cross-connection in which the PRU placed on another PTU joins the wireless power network as a condition for entry into the latch fault mode. An operation of the PTU when an error, including cross connection, occurs is described below in connection with FIG. 7.

Figure 7:
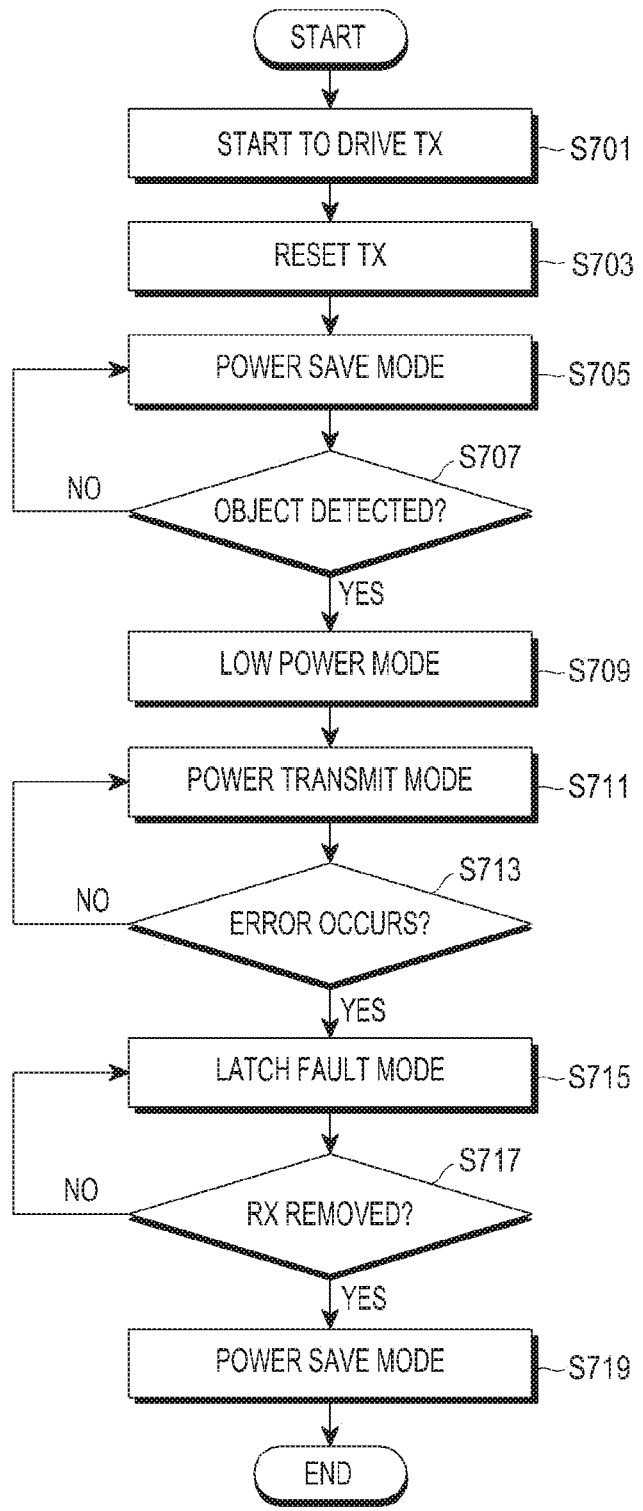
FIG. 7 is a flowchart illustrating a control method of a PTU according to an embodiment of the present disclosure.
Figure 8:
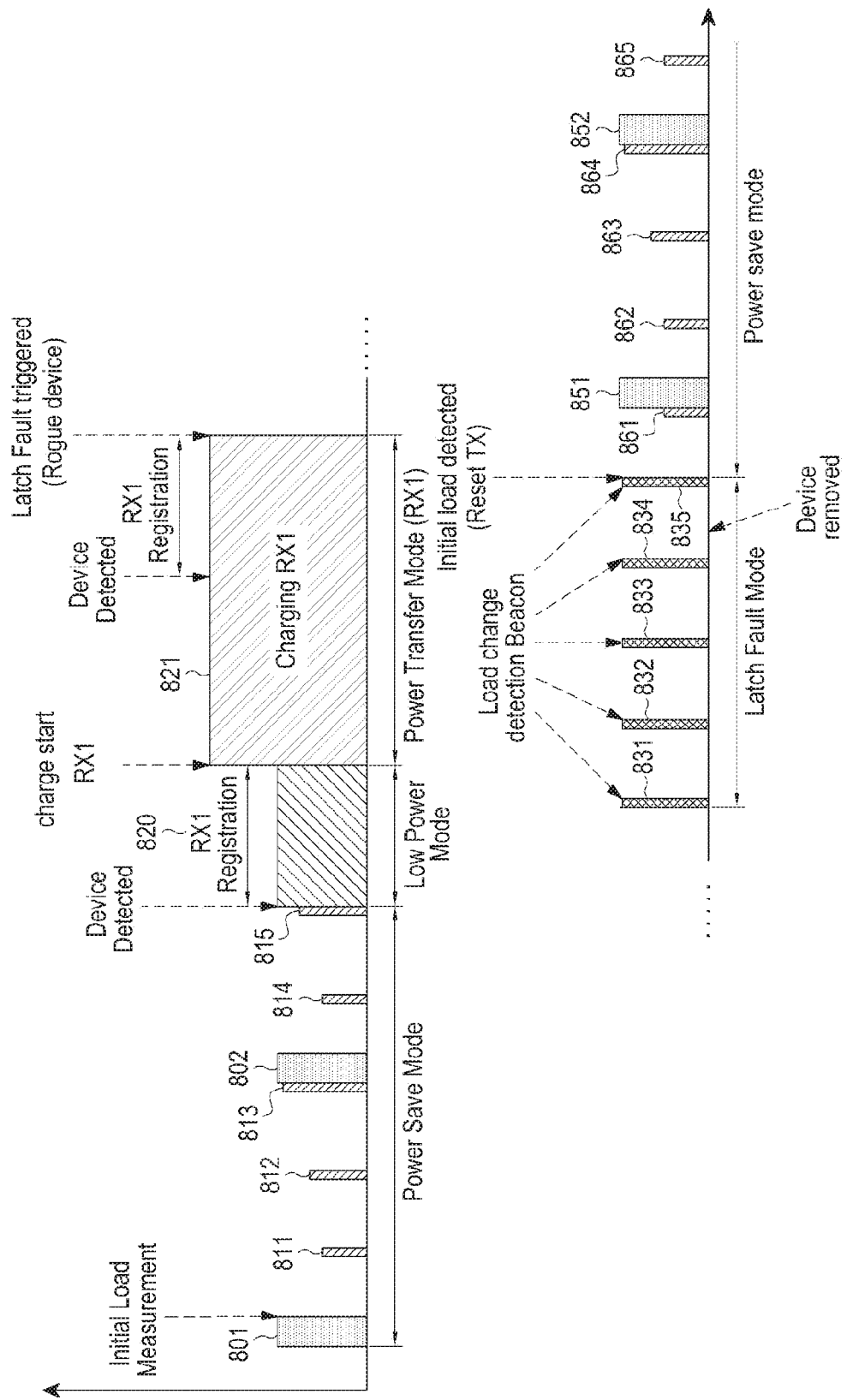
FIG. 8 is a graph illustrating power broadcast from a PTU on a time axis according to the control method illustrated in FIG. 7.

FIG. 7 is a flowchart illustrating a control method of a PTU according to an embodiment of the present disclosure. FIG. 8 is a graph illustrating power broadcast from a PTU on a time axis according to the control method illustrated in FIG. 7.

Referring to FIG. 7, the PTU initiates driving in step S701, resets the initial configuration in step S703, and enters into a power save mode in step S705. As described above, in the power save mode, the PTU may broadcast different amounts of power to the PRU.

Referring to FIG. 8, in the power save mode, the PTU broadcasts second detection powers 801 and 802 and third detection powers 811, 812, 813, 814, and 815 to the PRU. The PTU may periodically broadcast the second detection powers 801 and 802 at a second period, and may periodically broadcast the third detection powers 811, 812, 813, 814, and 815 at a third period. Although the power values of the third detection powers 811, 812, 813, 814, and 815 are illustrated as differing from each other, they may also be the same.

The second detection powers 801 and 802 may drive the PRU. Specifically, the second detection powers 801 and 802 be an amount of power by which a controller and/or a communication unit of the PRU may be driven.

The PRU may broadcast the second detection powers 801 and 802 and the third detection powers 811, 812, 813, 814, and 815 to the PRU at a second period and third period, respectively. When the PRU is placed on (or within a charging area of) the PTU, the impedance viewed from a point of the PTU may vary. The PTU may detect an impedance variation while the second detection powers 801 and 802 and the third detection powers 811, 812, 813, 814, and 815 are broadcast. For example, the PTU may detect an impedance variation while broadcasting the third detection power 815.

Referring again to FIG. 7, the PTU determines if an object is detected in step S707. When no object is detected in step S707, the PTU maintains the power save mode in step S705.

However, when the impedance varies and an object is detected in step S707, the PTU enters into the low power mode in step S709. In the low power mode, the PTU broadcasts driving power at which the controller and/or communication unit of the PRU may be driven.

For example, referring again to FIG. 8, the PTU may broadcast driving power 820 to the PRU. The PRU may receive the driving power 820 and drive the controller and/or communication unit thereon with the received driving power 820. The PRU may communicate with the PTU based on the driving power 820 by a predetermined scheme. For example, the PRU may communicate data for authentication and may join the wireless power network controlled by the PTU based on the same.

Referring again to FIG. 7, the PTU enters into a power transmit mode in which charging power is transmitted in step S711. For example, referring again to FIG. 8, the PTU may transmit the charging power 821 to the PRU.

In step S713, the PTU determines whether an error occurs in the power transmit mode. For example, the error may include placement of a foreign object on the PTU, cross connection, over voltage, over current, or over temperature. The PTU may include a sensing unit capable of measuring over voltage, over current, or over temperature. For example, the PTU may measure voltage or current at a reference point and may determine that the measured voltage or current in excess of a threshold meets the over voltage condition or over current condition. Additionally or alternatively, the PTU may include a temperature sensor, which measures the temperature at the reference point of the PTU. When the temperature at the reference point exceeds a threshold, the PTU may determine that the over temperature condition is met.

When determined to be in the over voltage, over current, or over temperature state, the PTU may reduce the wireless charging power by a predetermined value to prevent such over voltage, over current, and over temperature. When the voltage of the reduced wireless charging power is lower than a predetermined minimum value (e.g., the minimum voltage value ($V_{RECT\_MIN\_DYN}$) at the rear end of the rectifier of the PRU), the wireless charging is paused, and thus, the set voltage value may be readjusted.

Although FIG. 8 illustrates an example of an error that a foreign object is additionally placed on the PTU, the error is not limited thereto, and may PTU operate in a similar manner upon occurrence of another error, e.g., occurrence of an over voltage, over current, or over temperature.

When no error occurs in step S713, the PTU maintains the power transmit mode in step S711.

When an error occurs in step S713, the PTU enters into the latch fault mode in step S715.

For example, referring again to FIG. 8, the PTU may broadcast the first powers 831 to 835. Further, the PTU may output an error indication including at least one of a light radiation and an alert sound while in the latch fault mode.

When the PTU determines that the foreign object or the PRU is not removed in step S717, the PTU maintains the latch fault mode in step S715. However, when the PTU determines that the foreign object or the PRU is removed in step S717, the PTU reenters into the power save mode in step S719.

For example, referring again to FIG. 8, the PTU may broadcast the second powers 851 and 852 and the third powers 861 to 865.

Figure 9:
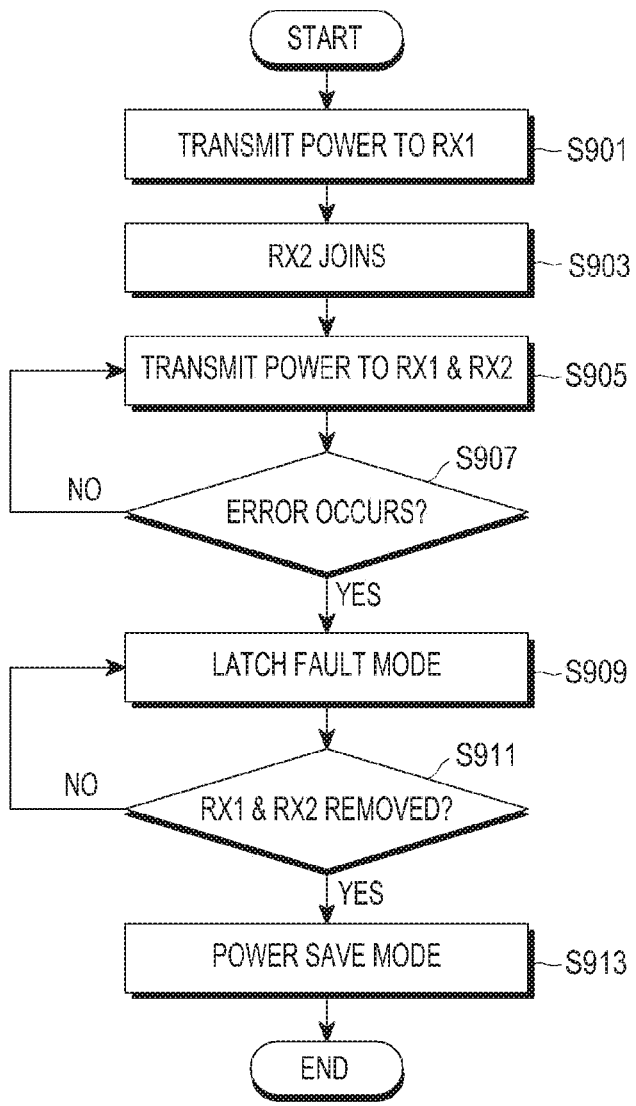
FIG. 9 is a flowchart illustrating a control method of a PTU according to an embodiment of the present disclosure.
Figure 10:
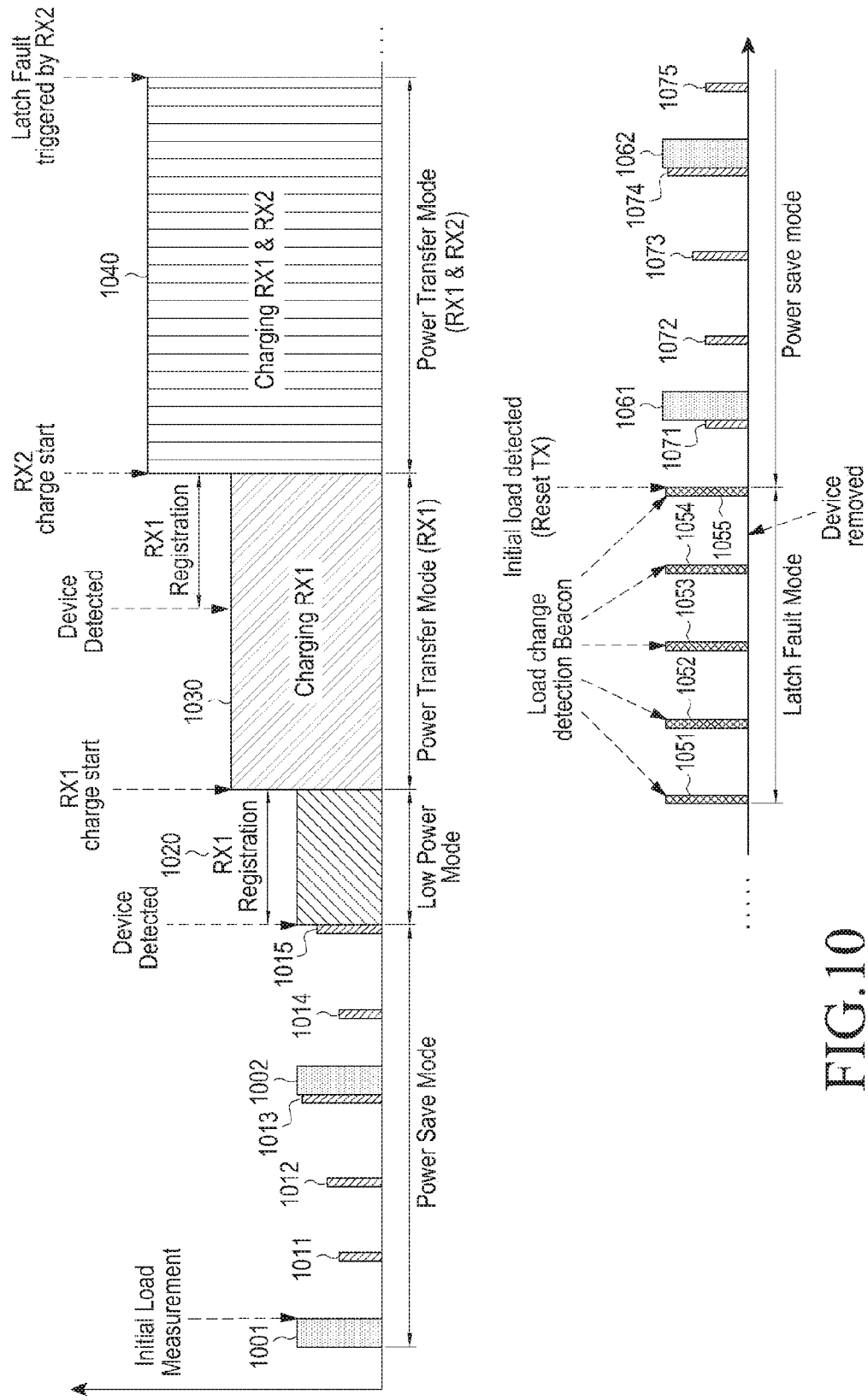
FIG. 10 is a graph illustrating power broadcast from a PTU on a time axis according to the control method illustrated in FIG. 9.

FIG. 9 is a flowchart illustrating a control method of a PTU according to an embodiment of the present disclosure. FIG. 10 is a graph illustrating power broadcast from a PTU on a time axis according to the control method illustrated in FIG. 9.

Referring to FIG. 9, the PTU transmits charging power to a first PRU in step S901.

In step S903, the PTU allows a second PRU to join the wireless power network.

In step S905, the PTU transmits charging power to the first PRU and the second PRU. Specifically, the PTU may transmit the summed charging power required for the first PRU and the second PRU.

For example, referring to FIG. 10, the PTU may maintain a power save mode in which second detection powers 1001 and 1002 and third detection powers 1011 to 1015 are broadcast.

Thereafter, the PTU may detect the first PRU and enter into a low power mode in which the detection power 1020 is maintained.

Thereafter, the PTU may enter into a power transmit mode in which first charging power 1030 is transmitted.

The PTU may detect the second PRU and allow the second PRU to join the wireless power network.

Thereafter, the PTU may transmit second charging power 1040 having an amount of power corresponding to the summed power required for the first PRU and the second PRU.

Referring again to FIG. 9, the PTU determines if an error occurs while transmitting charging power to both the first and second PRUs in step S907. For example, as described above, the error may include placement of a foreign object on the PTU, cross connection, over voltage, over current, over temperature, etc.

When no error occurs in step S907, the PTU keeps transmitting the second charging power 1040 in step S905.

However, when an error occurs in step S907, the PTU enters into the latch fault mode in step S909.

For example, referring again to FIG. 10, the PTU may broadcast the first powers 1051 to 1055 at a first period.

Referring again to FIG. 9, the PTU determines whether both the first PRU and the second PRU are removed in step S911. For example, as illustrated in FIG. 10, the PTU may detect an impedance variation while broadcasting the first powers 1051 to 1055, and may determine whether both the first PRU and the second PRU are removed based on whether the impedance returns to an initial value.

When determined that both the first PRU and the second PRU are removed in step S911, the PTU enters into the power save mode in step S913. For example, as illustrated in FIG. 10, the PTU may broadcast the second detection powers 1061 and 1062 and the third detection powers 1071 to 1075 at a second period and third period, respectively.

However, when both the first PRU and the second PRU are not removed in step S911, the PTU maintains the latch fault mode in step S909.

As set forth above, the PTU, even when applying charging power to a plurality of PRUs, may determine whether PRUs or foreign objects are removed when an error occurs.

Figure 11:
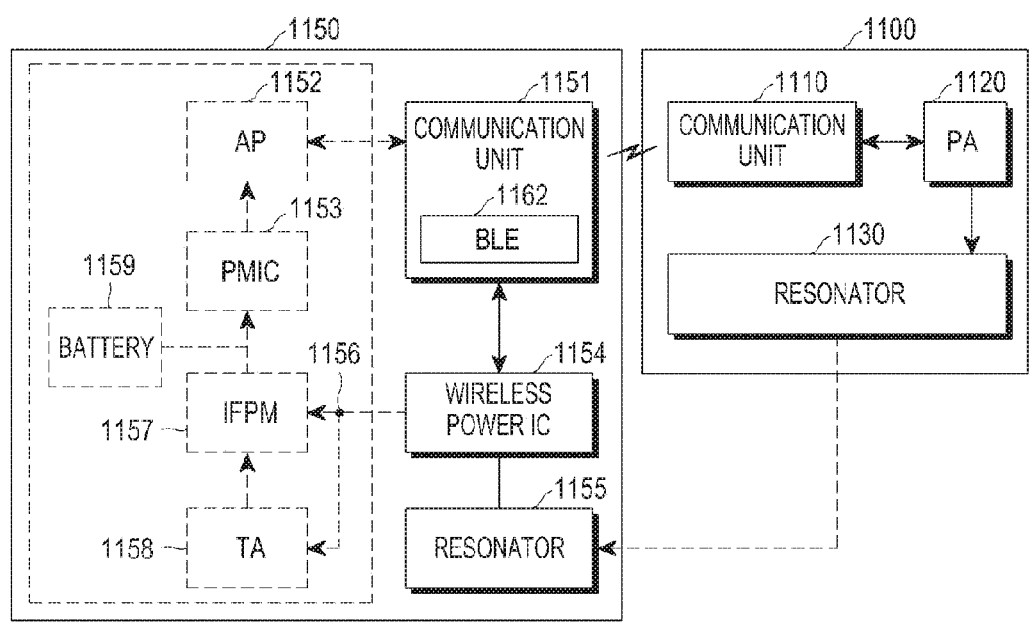
FIG. 11 illustrates a PTU and a PRU in a stand alone (SA) mode according to an embodiment of the present disclosure.

FIG. 11 illustrates a PTU and a PRU in an SA mode according to an embodiment of the present disclosure.

Referring to FIG. 11, the PTU 1100 includes a communication unit 1110, a power amplifier (PA) 1120, and a resonator 1130. The PRU 1150 includes a communication unit (a wireless power transmission (WPT) Communication integrated circuit (IC)) 1151, an application processor (AP) 1152, a power management integrated circuit (PMIC) 1153, a wireless power integrated circuit (WPIC) 1154, a resonator 1155, an interface power management (IFPM) IC 1157, a wired charging adapter (or travel adapter (TA) 1158, and a battery 1159.

The communication unit 1110 of the PTU 1100 may be implemented as a Wi-Fi/Bluetooth (BT) combo IC and may communicate with the communication unit 1151 of the PRU 1150 via a predetermined scheme, e.g., a Bluetooth low energy (BLE) scheme. For example, the communication unit 1151 of the PRU 1150 may transmit a PRU dynamic signal, e.g., having a data structure as shown in Table 1 above, to the communication unit 1110 of the PTU 1100. As described above, the PRU dynamic signal may include at least one of voltage information, current information, temperature information, and alert information of the PRU 1150.

Based on the received PRU dynamic signal, an output power value from the power amplifier 1120 may be adjusted. For example, when an over voltage, over current, and over temperature is applied to the PRU 1150, the power value output from the power amplifier 1120 may be reduced. Further, when the voltage or current of the PRU 1150 is less than a predetermined value, the power value output from the power amplifier 1120 may be increased.

The charging power from the resonator 1130 of the PTU 1100 may be wirelessly transmitted to the resonator 1155 of the PRU 1150.

The WPIC 1154 may rectify the charging power received from the resonator 1155 and perform DC/DC converting thereon. The WPIC 1154 may drive the communication unit 1151 or charge the battery 1159 with the converted power.

A wired charging terminal may be inserted into the wired charging adapter 1158. The wired charging adapter 1158 may have a wired charging terminal such as a 30-pin connector or USB connector inserted therein and may receive power from an external power source to charge the battery 1159.

The IFPM IC 1157 may process power applied from the wired charging terminal and output to the battery 1159 and the PMIC 1153.

The PMIC 1153 may manage the power applied to each component of the PRU 1150 and the power received (wiredly or wirelessly).

The AP 1152 may receive power information from the PMIC 1153 and control the communication unit 1151 to transmit a PRU dynamic signal to report the same.

A node 1156 connected with the WPIC 1154 may be connected with the wired charging adapter 1158. When the wired charging connector is inserted into the wired charging adapter 1158, a predetermined voltage, e.g., 5V, may be applied to the node 1156. The WPIC 1154 may monitor the voltage applied to the node 1156 to determine whether the wired charging adapter is inserted.

The AP 1152 has a stack of a predetermined communication scheme, e.g., a Wi-Fi/BT/BLE stack. Accordingly, upon communication for wireless charging, the communication unit 1151 loads a stack from the AP 1152 and then communicates with the communication unit 1110 of the PTU 1100 using a BT or BLE communication scheme, based on the stack.

However, data for performing wireless power transmission might not be brought from the AP 1152 while the AP 1152 powers off or such a power loss may occur where the ON state of the AP 1152 cannot be maintained while data is brought from the memory of the AP 1152 and used.

As such, when the remaining capacity of the battery 1159 is less than a minimum power threshold, the AP 1152 turns off, and some components for wireless charging in the PRU, e.g., the communication unit 1151, the WPIC 1154, and the resonator 1155, may be used to perform wireless charging. The state in which an amount of remaining power is such that the AP 1152 cannot be turned on may be referred to as a dead battery state.

In the dead battery state, the AP 1152 is not driven, and thus, the communication unit 1151 may receive a predetermined communication scheme stack, e.g., Wi-Fi/BT/BLE stack, from the AP 1152.

In preparation for such a situation, some of the predetermined communication schemes, e.g., a BLE stack, may be fetched from the AP 1152 and stored in a memory 1162 of the communication unit 1151. Accordingly, the communication unit 1151 may perform communication with the PTU 1100 using the communication scheme stack stored in the memory 1162, i.e., the wireless charging protocol. For example, the memory 1162 of the communication unit 1151 may include a read only memory (ROM)-type memory, and the BLE stack in the SA mode may be stored in the ROM-type memory.

As described above, when performing communication using the communication scheme stored in the memory 1162, the communication unit 1151 may be referred to as operating in the SA mode. Accordingly, the communication unit 1151 may manage a charging process based on the BLE stack.

Figure 12:
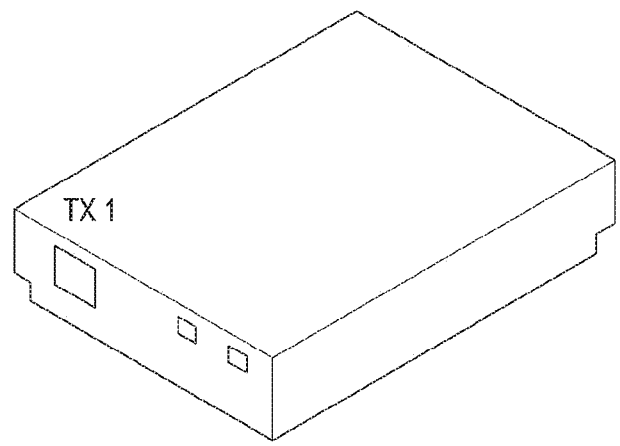
FIG. 12 illustrates a PTU according to an embodiment of the present disclosure.
Figure 13:
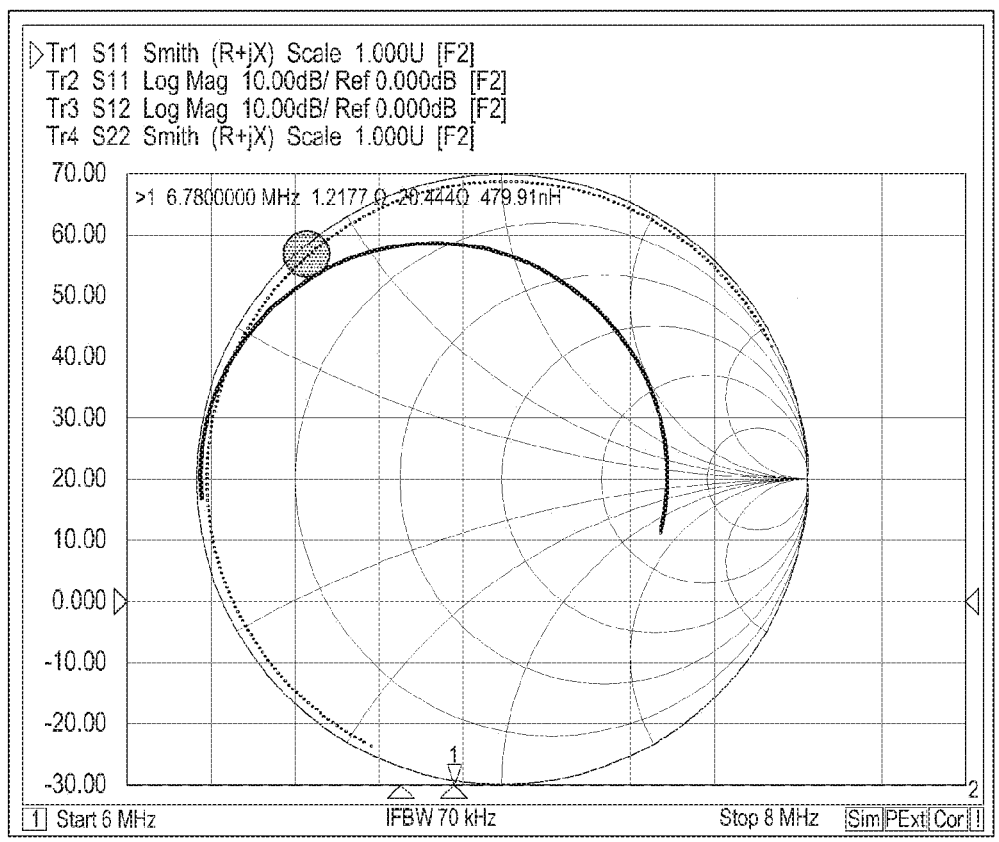
FIG. 13 illustrates impedance detected by a PTU according to an embodiment of the present disclosure.
Figure 14:
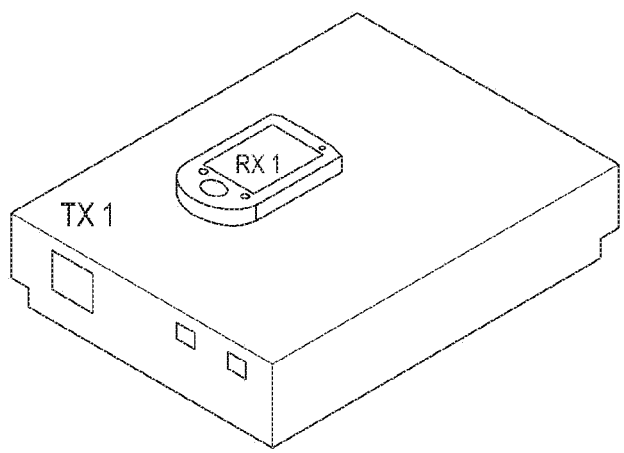
FIG. 14 illustrates a PTU on which a PRU is placed according to an embodiment of the present disclosure.
Figure 15:
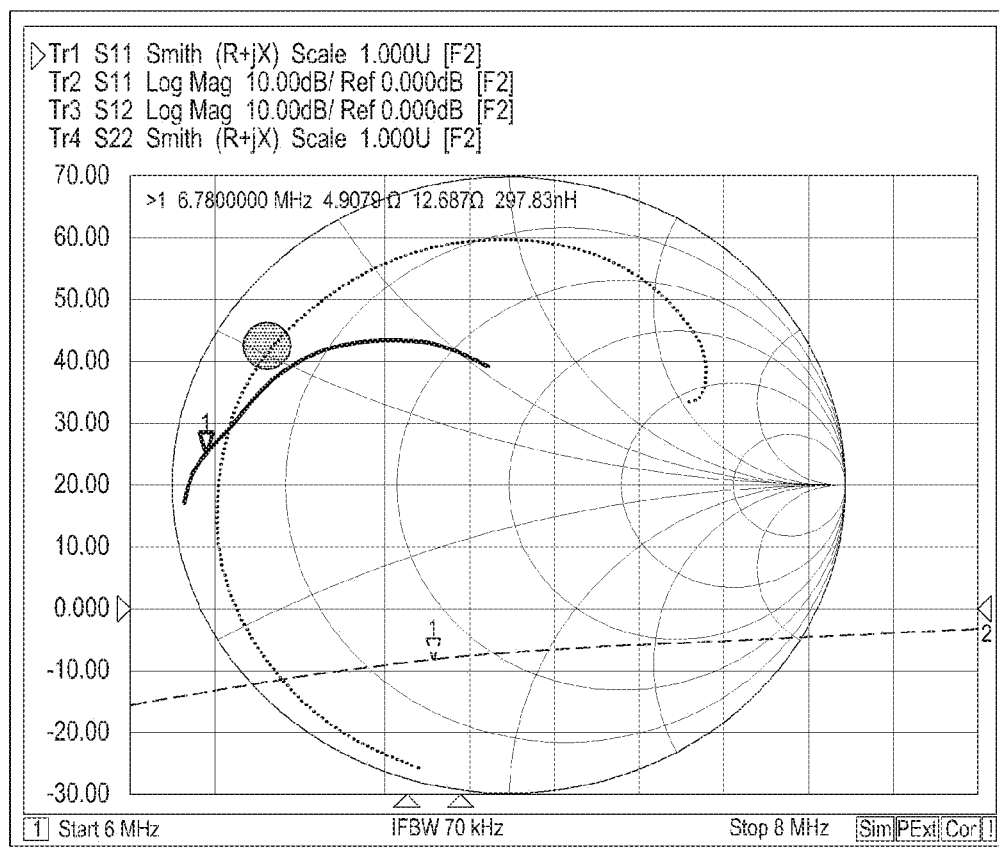
FIG. 15 illustrates impedance detected by a PTU on which a PRU is placed according to an embodiment of the present disclosure.

FIGS. 12 and 13 illustrate impedance when only a PTU is provided, and FIGS. 14 and 15 illustrate impedance when a PRU is placed on (or within a charging area of) a PTU.

Referring to FIGS. 12 to 15, the difference between the impedance detected when only the PTU is provided and the impedance detected when the PRU is placed on the PTU should be large enough for the PTU to effectively sense a load variation of the PRU. For example, although the resistance varies, the PTU may have difficulty in sensing a load when a variation in power due to the load variation is small. Further, there may be a spot or point on the PTU where the reactance is not varied.

To address these issues, a dummy load may be added to the PRU, and the PRU may be effectively detected by the PTU by the operation of a dummy load switch that may turn on/off the connection with the added dummy load.

Figure 16:
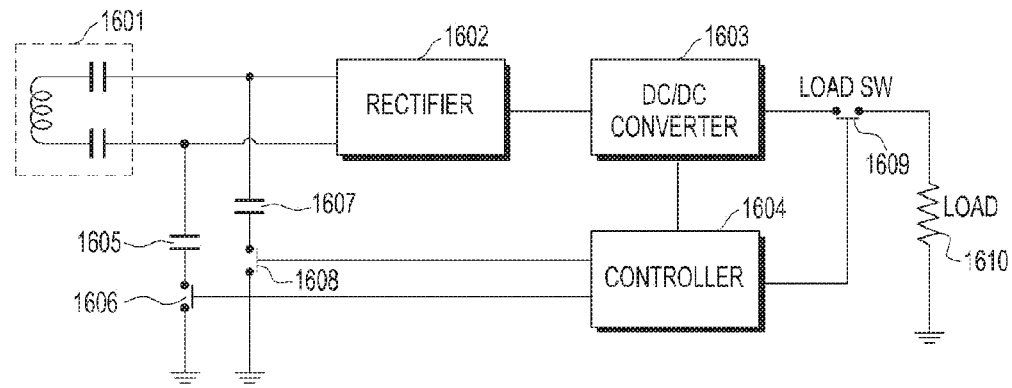
FIG. 16 is a circuit diagram illustrating a dummy load-added PRU according to an embodiment of the present disclosure.
Figure 17:
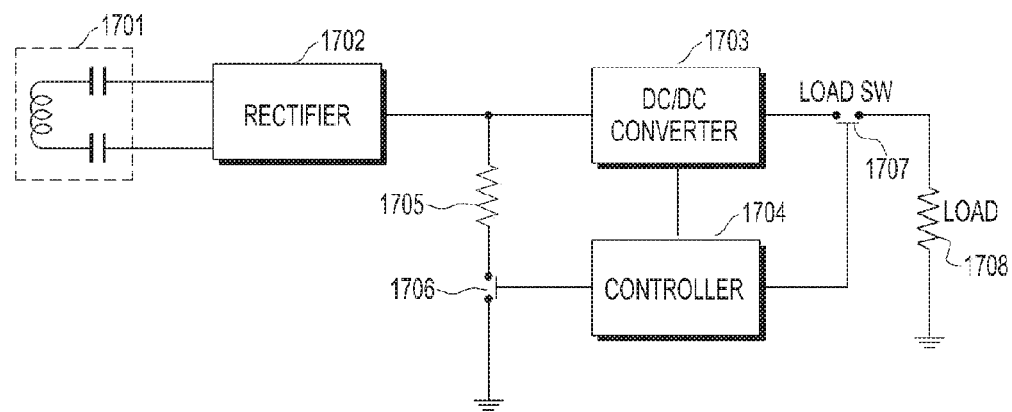
FIG. 17 is a circuit diagram illustrating a dummy load-added PRU according to an embodiment of the present disclosure.

As illustrated in the Smith charts in FIGS. 13 and 15, in order to present a larger impedance difference between when only the PTU is provided and when the PRU is placed on the PTU, a dummy load may be additionally connected onto the circuit of the PRU, as illustrated in FIGS. 16 and 17.

FIG. 16 is a circuit diagram illustrating a dummy load-added PRU according to an embodiment of the present disclosure.

Referring to FIG. 16, the PRU includes a resonator 1601, a rectifier 1602, a DC/DC converter 1603, and a controller (e.g., micro control unit (MCU)) 1604. The wireless power transmitted from the PTU may be transferred through the resonator 1601, the rectifier 1602, and the DC/DC converter 1603, and when the load switch 1605 is in an ON state, power may be supplied to the load 1610.

The dummy loads 1605 and 1607 are connected in parallel between the resonator 1601 and the rectifier 1602 on the circuit. Connection portions of the dummy loads further include dummy load switches 1606 and 1608 that may short or open the connection with the dummy loads (i.e., turn on or off). For example, the dummy load switches may be turned on/off by a control signal from the controller 1604.

Under various wireless charging circumstances, the controller 1604 may generate a desired load variation by controlling the dummy load switches 1606 and 1608 in appropriate ON or OFF states.

For example, when the dummy load switches 1606 and 1608 are turned on under the control of the controller 1604, the dummy loads 1605 and 1607 may be additionally connected to the wireless charging receiver circuit, and the PTU may detect the load by sensing the load variation of the PRU.

As AC dummy loads, condensers may be used as the dummy loads 1605 and 1607. For example, the value of the AC dummy load (AC Dummy Load value) may be 1 nF to 2.2 nF at 6.78 MHz.

FIG. 17 is a circuit diagram illustrating a dummy load-added PRU according to an embodiment of the present disclosure.

Referring to FIG. 17, the PRU includes a resonator 1701, a rectifier 1702, a DC/DC converter 1703, and a controller (e.g., MCU) 1704. Like in FIG. 16, the wireless power transmitted from the PTU may be transferred through the resonator 1701, the rectifier 1702, and the DC/DC converter 1703, and when the load switch 1707 is in an ON state, power may be supplied to the load 1708.

A dummy load 1705 is connected in parallel between the rectifier 1702 and the DC/DC converter 1703 on the circuit. A connection portion of the dummy load further includes a dummy load switch 1706 that may short or open the connection with the dummy load (i.e., turn on or off). For example, the dummy load switches may be turned on/off by a control signal from the controller 1704.

Under various wireless charging circumstances, the controller 1704 may generate a desired load variation by controlling the dummy load switch 1706 in an ON or OFF state.

For example, when the dummy load switch 1706 is turned on under the control of the controller 1704, the dummy load 1705 is additionally connected to the wireless charging receiver circuit, and the PTU may detect the load by sensing the load variation of the PRU.

As a DC dummy load, a resistor may be used as the dummy load 1705. For example, the value of the DC dummy load (DC Dummy Load value) may be 70 Ohms at 6.78 MHz.

Generally, a dummy load, when power is applied to a PRU, may turn a dummy load switch into an OFF state to open a dummy load circuit so that the dummy load is not detected in a PTU. That is, impedance measured by the PTU is not influenced by the dummy load.

A dummy load switch may be placed at one or more of an AC side (FIG. 16) and a DC side (FIG. 17), and when power is applied to the PRU, the dummy load switch may be opened according to various embodiments as will described below, and power may be applied to the PRU to turn on the MCU and may be then turned off by a control signal from the MCU.

A DC dummy load switch may be designed to maintain a short state when no power is applied. For example, when power is applied to a PRU for a short time by a beacon transmitted from a PTU, the dummy load switch may switch from short to open so that the PTU may sense a large load variation.

For the above-described load variation, as a circuit to forcedly generate a load at a front or rear end of the rectifier of the PRU so that an impedance variation (or power or phase variation) is detected by the PTU, a hardware (HW) circuit may be used or a software (SW) program may be used by the MCU to adjust the timing, period and/or section of the forced variation.

A method adding a load (e.g., a dummy load) to a front end of the rectifier, as illustrated in FIG. 16, may adjust a resonant frequency by a predetermined magnitude using a detuning capacitor at an AC end. The method may reduce transferred power, and the impedance of the PRU viewed from the PTU may vary.

Further, as illustrated in FIG. 17, a method adding a load to a rear end of a rectifier installs a resistance at a DC end to forcedly consume power, and the resistance component of the impedance of the PRU viewed from the PTU may vary.

In FIG. 16, because different impedance variations are detected according to combinations of the PTU/PRU, when the power of the PTU amplifier load-pull is consumed more, a problem, such as over current or over voltage, may arise in the PTU.

Further, in FIG. 17, the resistance alone is varied, and thus, when its value is not large, detection by the PTU is difficult, and when the value is too large, high power should be transferred to a long beacon of the PTU, which increases standby power consumption.

The wireless charging standards (A4WP) specify that a width in variation of power consumption at a rear end of a rectifier should be 0.5 W to 1.1 W, and thus, a need exists for a load generation method to meet such standard.

Figure 18:
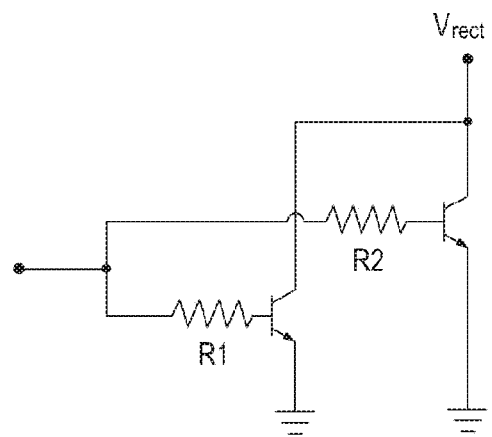
FIG. 18 illustrates a bleeder circuit applied to a PRU according to an embodiment of the present disclosure.
Figure 19:
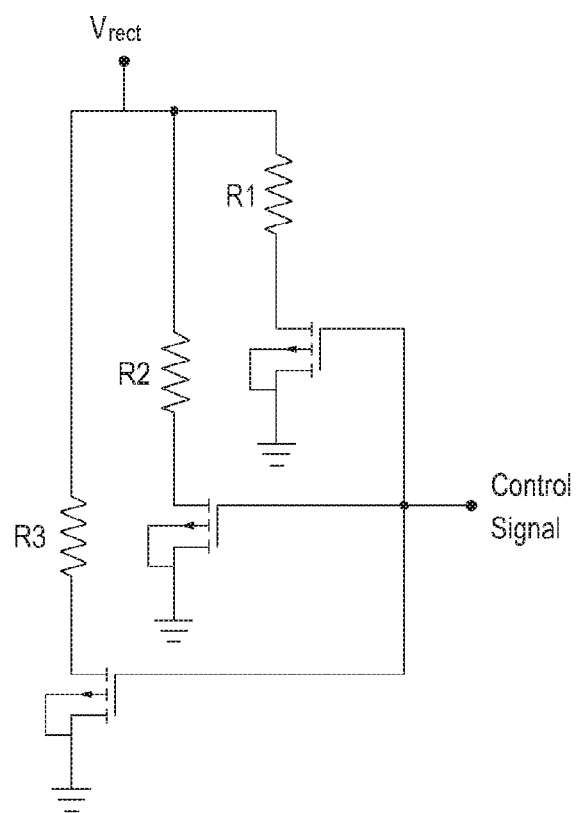
FIG. 19 illustrates a bleeder circuit applied to a PRU according to an embodiment of the present disclosure.

FIG. 18 illustrates a bleeder circuit applied to a PRU according to an embodiment of the present disclosure, and FIG. 19 illustrates a bleeder circuit applied to a PRU according to an embodiment of the present disclosure.

Because power at the rear end of a rectifier (Prect) varies depending on voltage at the rear end of the rectifier (Vrect), Prect should be adjusted to meet a predetermined power range (0.5 W to 1.1 W) using multiple circuits.

Accordingly, a circuit meeting the above conditions may be implemented using a multiple current source switch circuit as illustrated in FIG. 18 or a multiple resistive load as illustrated in FIG. 19.

Figure 20A:
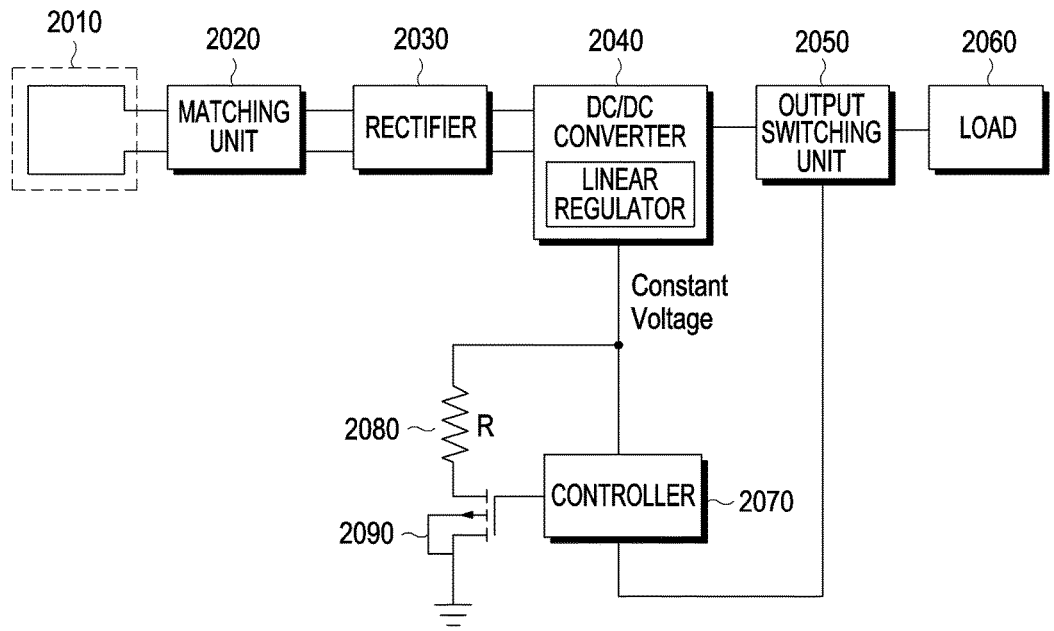
FIG. 20A illustrates a PRU according to an embodiment of the present disclosure.
Figure 20B:
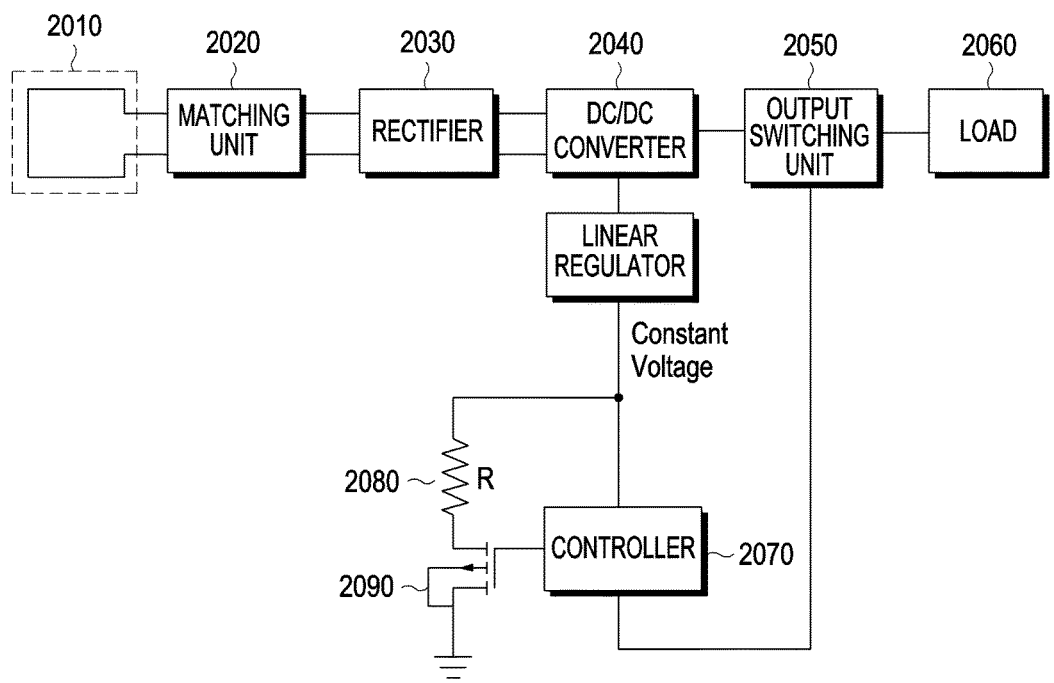
FIG. 20B illustrates a PRU according to an embodiment of the present disclosure.

FIG. 20A illustrates a PRU according to an embodiment of the present disclosure, and FIG. 20B illustrates a PRU according to an embodiment of the present disclosure.

Referring to FIGS. 20A and 20B, the PRU includes a resonator 2010, a matching circuit 2020, a rectifier 2030, a DC/DC converter 2040, an output switching unit (or a load switching unit) 2050, a load 2060, a controller (e.g., an MCU) 2070, a resistor 2080, and a switch 2090. The wireless power transmitted from the PTU may be transferred through the resonator 2010, the matching unit 2020, the rectifier 2030, and the DC/DC converter 2040 to the load 2060, and when the output switching unit 2050 is in an ON state, power may be supplied to the load 2060.

The resistor 2080 is connected in parallel to an output signal of the DC/DC converter 2040 on the circuit. According to an embodiment of the present disclosure, a current connected to the resistor may be provided as a constant voltage (e.g., 1.8V or 3.3V) of signal via a linear regulator (e.g., a low dropout regulator (LDO)) included in the DC/DC converter 2040, as illustrated in FIG. 20A, or additionally provided, as illustrated in FIG. 20B. Thus, the power consumed by the resistor 2080 may be constant.

The current flowing to the resistor 2080 may be controlled by the switching unit 2090, as controlled by the controller 2070. For example, when the controller 2070 turns on the switching unit 2090, the current flows through the resistor 2080 and thus may function as a dummy load.

The switching unit 2090 may include at least one field effect transistor (FET). For example, the controller 2070 may control a signal applied to the gate terminal of the FET to control the current flowing across the resistor 2080.

The controller 2070 may receive power obtained by converting power transmitted from the PTU by the DC/DC converter 2040 and may be driven. A current supplied to the controller 2070 may be provided as a constant voltage (e.g., 1.8V or 3.3V) of signal via a linear regulator (e.g., an LDO) included in the DC/DC converter 2040, as illustrated in FIG. 20A, or additionally provided, as illustrated in FIG. 20B. Thus, the voltage of signal supplied to the controller 2070 may be constant.

For example, under various wireless charging circumstances, the controller 2070 may generate a desired load variation by controlling the switching unit 2090 in an ON or OFF state.

When the switching unit 2090 is turned on under the control of the controller 2070, a load (e.g., the resistor 2080) may be additionally connected to the wireless charging receiver circuit, and the PTU may detect the load by sensing the load variation of the PRU.

For example, the resistor 2080 may function as a dummy load. For example, the value of the DC dummy load (DC Dummy Load value) may be 70 Ohms at 6.78 MHz.

When power is applied to the PRU, the switching unit 2090 may be turned into an OFF state to open the current flowing through the resistor 2080 so that the dummy load is not detected in the PTU. That is, the impedance measured by the PTU is not influenced by the dummy load.

According to an embodiment of the present disclosure, when power is applied to the PRU, the switching unit 2090 (e.g., the dummy load switch) may be opened, and after power is applied to the PRU so that the controller 2070 is turned on, it may be opened by a control signal from the controller 2070.

The DC dummy load switch may be designed to maintain the short state when no power is applied. When power is applied to the PRU for a short time by a beacon transmitted from the PTU, the controller 2070 may be driven to perform control so that the switching unit 2090 may switch from short to open so that the PTU may sense a large load variation.

Figure 21:
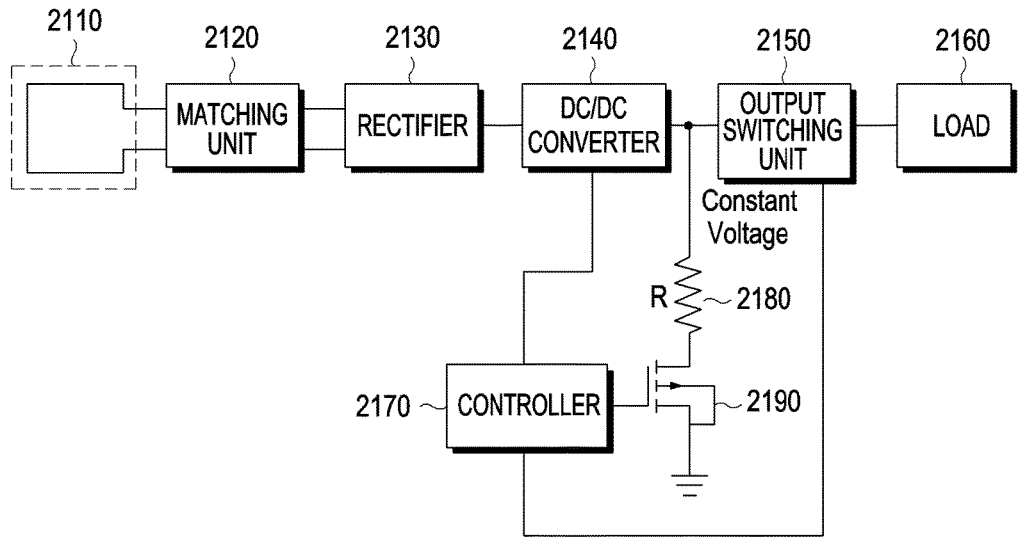
FIG. 21 illustrates a PRU according to an embodiment of the present disclosure.

FIG. 21 illustrates a PRU according to an embodiment of the present disclosure.

Referring to FIG. 21, the PRU includes a resonator 2110, a matching circuit 2120, a rectifier 2130, a DC/DC converter 2140, an output switching unit (or load switching unit) 2150, a load 2160, a controller (e.g., an MCU) 2170, a resistor 2180, and a switch 2190. The wireless power transmitted from the PTU may be transferred through the resonator 2110, the matching unit 2120, the rectifier 2130, and the DC/DC converter 2140 to the load 2160, and when the output switching unit 2150 is in an ON state, power may be supplied to the load 2160.

The resistor 2180 is connected between the DC/DC converter 2040 and the output switching unit 2150 on the circuit. The voltage value of the signal output from the DC/DC converter 2040 may have a constant value (e.g., 5V). Thus, the power consumed by the resistor 2180 may be constant.

The current flowing to the resistor 2180 may be controlled by the switching unit 2190 controlled by the controller 2170. For example, when the controller 2170 turns on the switching unit 2190, the current flows through the resistor 2180 and thus may function as a dummy load.

The switching unit 2190 may include at least one field effect transistor (FET). For example, the controller 2170 may control a signal applied to the gate terminal of the FET to control the current flowing across the resistor 2180.

The controller 2170 may receive power obtained by converting power transmitted from the PTU by the DC/DC converter 2140 and may be driven. A current supplied to the controller 2170 may be provided as a constant voltage (e.g., 1.8V or 3.3V) of signal via a linear regulator (e.g., an (LDO) included in the DC/DC converter 2140 or additionally provided. Thus, the voltage of signal supplied to the controller 2170 may be constant.

For example, under various wireless charging circumstances, the controller 2170 may generate a desired load variation by controlling the switching unit 2190 in an ON or OFF state.

For example, when the switching unit 2190 is turned on under the control of the controller 2170, a load (e.g., the resistor 2180) may be additionally connected to the wireless charging receiver circuit, and the PTU may detect the load by sensing the load variation of the PRU. For example, the resistor 2180 may function as a dummy load.

When power is applied to the PRU, the switching unit 2190 may be turned into an OFF state to open the current flowing through the resistor 2180 so that the dummy load is not detected in the PTU. That is, the impedance measured by the PTU is not influenced by the dummy load.

According to an embodiment of the present disclosure, when power is applied to the PRU, the switching unit 2190 (e.g., the dummy load switch) may be opened, and after power is applied to the PRU so that the controller 2170 is turned on, it may be opened by a control signal from the controller 2170.

The DC dummy load switch 2190 may be designed to maintain the short state when no power is applied. For example, when power is applied to the PRU for a short time by a beacon transmitted from the PTU, the controller 2170 may be driven to perform control so that the switching unit 2190 may switch from short to open so that the PTU may sense a large load variation.

The range of resistance may be determined using Equation (1) below.

$$R = \frac{(V_{constant\ voltage})^2}{(P_{PRU\ circuit\ consumption} + P_{Bleeder})} \quad (1)$$

In Equation (1), $P_{Bleeder}$ represents power consumed in a bleeder circuit, and $P_{PRU\ circuit\ consumption}$ represents power consumed in, e.g., the MCU, voltage regulator, and sensor of the PRU circuit.

Figure 22:
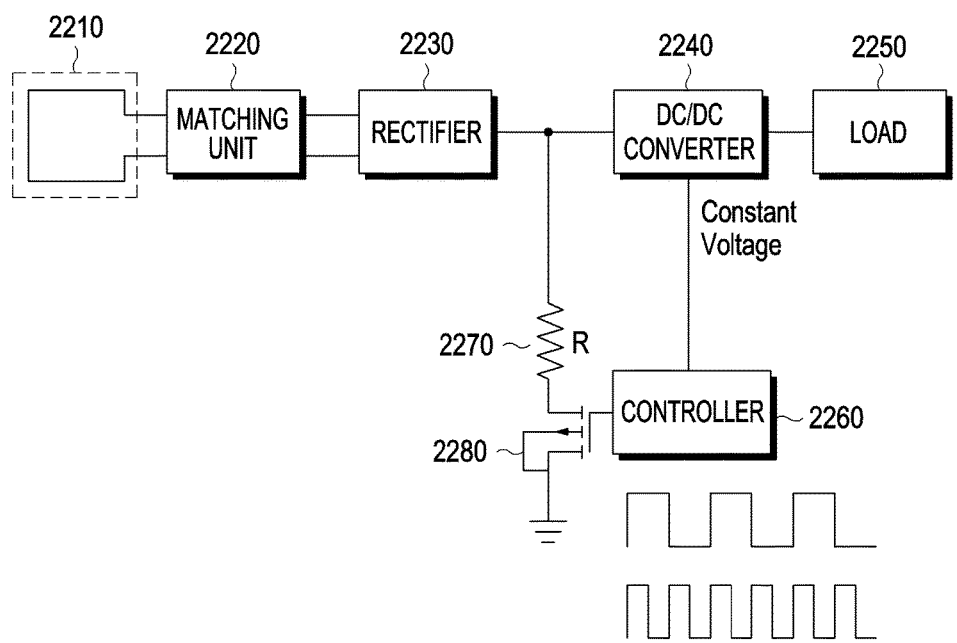
FIG. 22 illustrates a PRU according to an embodiment of the present disclosure.

FIG. 22 illustrates a PRU according to an embodiment of the present disclosure.

Referring to FIG. 22, the PRU includes a resonator 2210, a matching circuit 2220, a rectifier 2230, a DC/DC converter 2240, a load 2250, a controller (e.g., an MCU) 2260, a resistor 2270, and a switch 2280. The wireless power transmitted from the PTU may be transferred through the resonator 2210, the matching unit 2220, the rectifier 2230, and the DC/DC converter 2240 to the load 2250.

The resistor 2270 is connected between the rectifier 2230 and the DC/DC converter 2240 on the circuit. The voltage of the output signal from the rectifier 2230 may be 0V to 20V. As per the wireless charging standards, the voltage of a signal flowing through the resistor 2270 should be maintained in a predetermined range (e.g., 0.5V to 1.1V).

According to an embodiment of the present disclosure, the controller 2260 may perform PWM control on the switching unit 2280 so that the power consumed by the resistor 2270 falls within a predetermined range.

For example, the current flowing to the resistor 2270 may be controlled by the switching unit 2280 controlled by the controller 2260. When the controller 2260 turns on the switching unit 2280, the current flows through the resistor 2270, and thus, may function as a dummy load.

The switching unit 2280 may include at least one field effect transistor (FET). For example, the controller 2260 may control a signal applied to the gate terminal of the FET to control the current flowing across the resistor 2270.

The controller 2260 may receive power obtained by converting power transmitted from the PTU by the DC/DC converter 2240 and may be driven. A current supplied to the controller 2260 may be provided as a predetermined voltage (e.g., 1.8V or 3.3V) signal via a linear regulator (e.g., an LDO) included in the DC/DC converter 2240 or additionally provided. Thus, the voltage of signal supplied to the controller 2260 may be constant.

For example, under various wireless charging circumstances, the controller 2260 may generate a desired load variation by controlling the switching unit 2280 in an ON or OFF state.

Under the control of the controller 2260, power consumption by a load (e.g., the resistor 2270) occurs in the wireless charging receiver, and the PTU may detect the load by sensing a variation in the load of the PRU. Accordingly, the resistor 2270 may function as a dummy load.

When power is applied to the PRU, the switching unit 2280 may be turned into an OFF state to open the current flowing through the resistor 2270 so that the dummy load is not detected in the PTU. That is, the impedance measured by the PTU is not influenced by the dummy load.

According to an embodiment of the present disclosure, when power is applied to the PRU, the switching unit 2280 (e.g., the dummy load switch) may be opened, and after power is applied to the PRU so that the controller 2260 is turned on, it may be opened by a control signal from the controller 2260.

The DC dummy load switch 2280 may maintain the short state when no power is applied. When power is applied to the PRU for a short time by a beacon transmitted from the PTU, the controller 2070 may be driven to perform control so that the switching unit 2280 may switch from short to open so that the PTU may sense a large load variation.

As illustrated in FIG. 22, the power consumed by the resistor bleeder circuit at the rear end of the rectifier 2230 may be adjusted by the switching unit 2280, e.g., an FET switch. The controller 2260 may control the ON/OFF time of the switching unit 2280 with, e.g., a PWM signal to adjust the duty of the PWM to thereby adjust the power consumed in the resistor 2270.

The load variation generation methods and circuits according to embodiments of the present disclosure, as described above, may be utilized for device detection, long beacon extension, cross connection prevention and detection, rogue device detection, and in-band signaling.

Accordingly, a PTU may determine whether there is a device by comparing a pre-stored open-state transmission signal waveform with a waveform of a signal being transmitted.

A PTU may determine the type of a device by comparing a pre-stored open-state transmission signal waveform with a waveform of a signal being transmitted.

A PTU may determine whether a device is positioned nearby by comparing a pre-stored open-state transmission signal waveform with a waveform of a signal being transmitted.

A PTU may determine the type of an object or device by comparing a pre-stored open-state transmission signal waveform with a waveform of a signal being transmitted and determining a time when the waveform is varied.

Although the present disclosure has been shown and described in connection with certain embodiments thereof, it should be appreciated by one of ordinary skill in the art that various changes may be made thereto without departing from the scope of the present disclosure recited in the claims. Various modifications and changes may be made to the present disclosure, without departing from the scope of the present disclosure, and such modifications and changes should not be individually interpreted from the technical spirit or scope of the present disclosure.

What is claimed is:

1. A method for generating a load variation of a wireless power receiver (PRU) for detecting the PRU in a wireless charging system, the method comprising:
   receiving a wireless power signal from a wireless power transmitter (PTU);
   rectifying the received wireless power signal into a direct current (DC) signal;
   converting, by a DC/DC converter, the DC signal to a first power for charging a rechargeable battery;
   regulating, by a linear regulator, the first power to a second power for a controller; and
   generating the load variation for detecting the PRU by adjusting an amount of the second power,
   wherein adjusting the amount of the second power comprises the controller controlling a switch, and
   wherein a resistor is connected between the switch and the linear regulator.

2. The method of claim 1, wherein the switch is controlled by the controller driven by the second power.

3. The method of claim 2, wherein a voltage applied to the resistor is the same as a voltage applied to the controller when the switch is in an ON state.

4. The method of claim 2, wherein the controller performs ON/OFF control on a current flowing across the resistor in a predetermined pattern by controlling the switch.

5. The method of claim 1, wherein the wireless power signal received from the PTU is a short beacon signal.

6. A wireless power receiver (PRU) that generates a load variation in a wireless charging system, the PRU comprising:
- a power receiver configured to receive a wireless power signal from a wireless power transmitter (PTU);
- a rectifier configured to rectify the wireless power signal received from the power receiver into a direct current (DC) signal;
- a DC/DC converter configured to convert the DC signal to a first power for charging a rechargeable battery;
- a linear regulator configured to regulate the first power to a second power for a controller;
- a switch configured to adjust an amount of the second power; and
- a resistor connected between the switch and the linear regulator,
- wherein the load variation for detecting the PRU is generated by the controller controlling the switch to adjust the amount of the second power.

7. The PRU of claim 6, wherein the switch is controlled by the controller driven by the second power.

8. The PRU of claim 6, wherein a voltage applied to the resistor is the same as a voltage applied to the controller when the switch is in an ON state.

9. The PRU of claim 6, wherein the controller performs ON/OFF control on a current flowing across the resistor in a predetermined pattern by controlling the switch.

10. The PRU of claim 6, wherein the wireless power signal received from the PTU is a short beacon signal.

11. The PRU of claim 10, wherein the controller is driven by the short beacon signal.

12. The PRU of claim 6, wherein the switch includes a field effect transistor (FET).

13. The PRU of claim 12, wherein the controller controls driving of the FET using a pulse width modulation (PWM) signal.

* * * * *